United States Patent
Wang et al.

(10) Patent No.: US 11,928,359 B2
(45) Date of Patent: Mar. 12, 2024

(54) MEMORY SWAPPING METHOD AND APPARATUS

(71) Applicant: HUAWEI TECHNOLOGIES CO., LTD., Guangdong (CN)

(72) Inventors: Chengke Wang, Hangzhou (CN); Yongjun Wei, Hangzhou (CN); Xie Miao, Hangzhou (CN); Wei Fang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 17/867,880

(22) Filed: Jul. 19, 2022

(65) Prior Publication Data

US 2022/0350531 A1    Nov. 3, 2022

Related U.S. Application Data

(63) Continuation of application No. PCT/CN2020/113676, filed on Sep. 7, 2020.

(30) Foreign Application Priority Data

Jan. 20, 2020    (CN) .......................... 202010066109.0

(51) Int. Cl.
*G06F 3/06* (2006.01)

(52) U.S. Cl.
CPC .......... *G06F 3/0656* (2013.01); *G06F 3/0608* (2013.01); *G06F 3/064* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2015/0242121 A1 | 8/2015 | Tsirkin | |
| 2015/0242432 A1* | 8/2015 | Bak | .......................... G06F 12/08 |
| | | | 707/693 |

(Continued)

FOREIGN PATENT DOCUMENTS

| | | |
|---|---|---|
| CN | 101853219 A | 10/2010 |
| CN | 102831069 A | 12/2012 |

(Continued)

OTHER PUBLICATIONS

Office Action issued in CN202010066109.0, dated Jul. 29, 2023, 12 pages.

(Continued)

*Primary Examiner* — Brian R Peugh

(57) ABSTRACT

A memory swapping method and apparatus are provided. The method includes: selecting n to-be-swapped-out pages; compressing the n to-be-swapped-out pages into n compressed blocks, and buffering the n compressed blocks in a compressed data buffer area; organizing at least one of the n compressed blocks into m to-be-written units; and writing the m to-be-written units into a swap area of a non-volatile storage device in a maximum of m batches, where at least one of the m to-be-written units is stored in a segment of continuous space in the swap area. The method reduces a quantity of write times during memory swapping, thereby prolonging a service life of the non-volatile storage device.

12 Claims, 12 Drawing Sheets

(56) References Cited

U.S. PATENT DOCUMENTS

| | | |
|---|---|---|
| 2017/0004069 A1 | 1/2017 | Li et al. |
| 2019/0079876 A1 | 3/2019 | Kim et al. |
| 2019/0146912 A1 | 5/2019 | Frolikov |
| 2019/0370009 A1 | 12/2019 | Venkatraman et al. |

FOREIGN PATENT DOCUMENTS

| | | |
|---|---|---|
| CN | 103019948 A | 4/2013 |
| CN | 103649927 A | 3/2014 |
| CN | 103729305 A | 4/2014 |
| CN | 104281528 A | 1/2015 |
| CN | 104461393 A | 3/2015 |
| CN | 105027093 A | 11/2015 |
| CN | 105550123 A | 5/2016 |
| CN | 105592108 A | 5/2016 |
| CN | 106030547 A | 10/2016 |
| CN | 109508301 A | 3/2019 |
| CN | 110647291 A | 1/2020 |

OTHER PUBLICATIONS

International Search Report and Written Opinion issued in PCT/CN2020/113676, dated Dec. 9, 2020, 12 pages.
Kim Jongseok et al: $ezswap$: Enhanced Compressed Swap Scheme for Mobile Devices, IEEE Access, vol. 7, Oct. 7, 2019 (Oct. 7, 2019), pp. 139678-139691 XP011748405, Total: 17 pages.
Extended European Search Report issued in EP20915435.0, dated Sep. 21, 2023, 8 pages.

* cited by examiner

MEMORY SWAPPING METHOD AND APPARATUS

CROSS-REFERENCE TO RELATED APPLICATIONS

This application is a continuation of International Application No. PCT/CN2020/113676, filed on Sep. 7, 2020, which claims priority to Chinese Patent Application No. 202010066109.0, filed on Jan. 20, 2020. The disclosures of the aforementioned applications are hereby incorporated by reference in their entireties.

TECHNICAL FIELD

Embodiments of this application relate to the field of memory management of electronic devices, and in particular, to a memory swapping method.

BACKGROUND

A memory is one of important components in a computer. It is a bridge for communication with a central processing unit (CPU). All programs in the computer are run in the memory. Therefore, performance of the memory greatly affects the computer. The memory, also known as an internal memory, is used to temporarily store computed data in the CPU and exchange data with an external memory, such as a hard drive. When the computer is running, the CPU transfers the data that needs to be calculated to the memory for calculation. After calculation is complete, the CPU sends out a calculation result. Operation of the memory also determines stable operations of the computer. Due to a limitation on a memory capacity, a memory reclamation mechanism is usually designed in a common computing device. When memory of a system is insufficient, a part of occupied memory space is reclaimed to satisfy a new memory allocation request. Memory reclamation objects are mainly classified into a file page and an anonymous page. The anonymous page is a page without a file background, for example, a heap, a stack, or a data segment. For a modified file page, the file page needs to be written back to a disk file during memory reclamation, whereas a file page that is not modified is directly released.

For an anonymous page, in a conventional technology, memory reclamation may be performed by using a swap mechanism. In a process of memory reclamation for an anonymous page, a system swaps the anonymous page in a memory into a swap area or a swap file of a non-volatile storage device to reclaim memory space occupied by the anonymous page. This achieves an effect of expanding currently available memory space. A principle of the swap mechanism is as follows: When a memory resource is insufficient, a memory page with a lowest use frequency is selected according to a least recently used (LRU) algorithm, and the memory page with a lowest use frequency is compressed into a compressed block and buffered in a compressed data buffer area. When a volume of data buffered in the compressed data buffer area reaches a threshold, a compressed block with a lowest use frequency is selected according to the LRU algorithm, and the compressed block with a lowest use frequency is decompressed and written into the swap area of the non-volatile storage device. It can be learned that, when the memory resource is insufficient, the system frequently writes pages in the memory into the swap area of the non-volatile storage device, and then reads the pages into the memory when a process accesses the pages written into the swap area of the non-volatile storage device. For an embedded electronic device, for example, a mobile phone or a tablet computer, a non-volatile storage device used in the embedded electronic device is usually a flash storage device. A quantity of read/write times of the flash storage device is limited, and a service life of the flash storage device is affected when the swap mechanism is used.

SUMMARY

Embodiments of this application provide a memory swapping method and apparatus, to be applied to the field of memory management of electronic devices, to reduce a quantity of read/write times of a non-volatile storage device and prolong a service life of the non-volatile storage device.

This application provides a memory swapping solution for an anonymous page.

The following first describes terms in embodiments of this application.

Running memory: It is a memory required when a program is run, and can only temporarily store data for exchanging cache data with a CPU. Generally, the running memory is a random access memory (RAM).

Compressed data buffer area: a segment of memory space used for storing a page/compressed block swapped out from a running memory.

Compressed page: a memory page used for temporarily storing a compressed block in a process of swapping out the compressed block from a compressed data buffer area to a swap area of a non-volatile storage device.

Swap sub-area: a memory space used for temporarily storing a compressed block in a process of swapping out the compressed block from a compressed data buffer area to a swap area of a non-volatile storage device. A size of the swap sub-area is an integer quantity of pages, for example, 32 K.

Swap area of a non-volatile storage device: a space that is in the non-volatile storage device such as a disk and that is used for storing swapped-out data.

According to a first aspect, an embodiment of this application provides a memory swapping method. The method includes: selecting n to-be-swapped-out pages, where n is an integer greater than 0; compressing the n to-be-swapped-out pages into n compressed blocks, and buffering the n compressed blocks in a compressed data buffer area; organizing at least one of the n compressed blocks into m to-be-written units, where m is an integer less than n and greater than and a size of the to-be-written unit is an integer quantity of pages; and writing the m to-be-written units into a swap area of a non-volatile storage device in a maximum of m batches, where at least one to-be-written unit is stored in a segment of continuous space in the swap area.

According to this method, during page swap-out, the to-be-swapped-out pages are compressed into the compressed blocks, to reduce a volume of data written in a memory swapping process, thereby indirectly reducing a quantity of write times. Further, the compressed block is organized into the to-be-written units, and at least one to-be-written unit is written into a segment of continuous space in the swap area each time. Compared with conventional technologies, in this method, a write volume in each 110 operation is greatly increased. This reduces a quantity of write times in the memory swapping process, thereby reducing impact on a service life of the non-volatile storage device in the memory swapping process.

It can be understood that, m may be an integer equal to n. However, this case occurs only when the to-be-written unit has a size of one page and a compressed block corresponding to each to-be-swapped-out page occupies one page. In this application, based on compression on a to-be-swapped-out page and size setting of a to-be-written unit, the foregoing effects can be achieved in most cases.

It should be noted that, the foregoing to-be-written unit is a compressed block set of a size of the to-be-written unit. For example, one to-be-written unit is four pages. In this case, a size of the to-be-written unit is 32 K. In a page swap-out process, in this application, at least one compressed block is stored in a unit of 32 K, until all to-be-swapped-out compressed blocks are stored. It can be understood that, all the to-be-swapped-out compressed blocks may occupy a plurality of segments of 32K space. In addition, in this application, the compressed blocks are written into the swap area by using 32 K as a minimum unit.

In a specific example, assuming that a system needs to swap out 10 compressed blocks: a compressed block 1, a compressed block 2, . . . , and a compressed block 10. A total data volume of the compressed blocks 1 to 6 is 32 K, and a total data volume of the compressed blocks 7 to 10 is 32 K. In a swap-out process, the 10 compressed blocks are organized into two to-be-written units. If there is a segment of 64K continuous space in the swap area, the two to-be-written units may be written into the swap area at a time; otherwise, the two to-be-written units are written into the swap area in two batches.

A size of a swap sub-area mentioned below is the same as that of a to-be-written unit.

An invoker mentioned below may be an operating system, or may be an application at an application layer.

In a possible implementation, during selection of the n to-be-swapped-out pages, the invoker may indicate a group identifier, and then select the n to-be-swapped-out pages with the group identifier. The group identifier includes an identifier of a process group corresponding to similar resource use behaviors, a process identifier, an application identifier, or an access time. Alternatively, the group identifier may be another identifier that can be figured out by a person skilled in the art and that is used to group the to-be-swapped-out pages. This is not specifically limited in this application. n may also be indicated by the invoker. The invoker may be an operating system or an application at an application layer. This is not limited in this application. In this application, the invoker may decide an occasion for invoking the method described in this application.

After a group identifier is determined, for example, after n to-be-swapped-out pages corresponding to a process A are determined to be selected, n least-used pages may be selected according to a least recently used (LRU) algorithm. It should be noted that, in this embodiment, the to-be-swapped-out pages may alternatively be selected according to another algorithm, for example, a least frequently used (LFU) algorithm. This is not limited in this application.

In this manner, because the invoker knows a use frequency of a process, an application, or the like, the invoker may choose, according to its own policy, for example, the LRU algorithm, to swap out a page corresponding to a process or an application with a lowest use frequency. This prevents a page that is just swapped out from being swapped in again in a short time. In addition, in this manner, pages with a same group identifier may be selected during selection of the to-be-swapped-out pages. This paves a way for subsequently grouping the pages with a same group identifier, buffering and swapping out an entire obtained group, reducing a quantity of read/write times in a swapping process, and improving swapping efficiency.

It can be understood that, a process with a lowest use frequency, a memory page with a lowest use frequency, or a compressed block with a lowest use frequency means a least used process, a least used memory page, or a least used compressed block that is selected according to the LRU algorithm.

In a possible implementation, after a page is selected according to the LRU algorithm, whether the page is an anonymous page is determined; and if the page is an anonymous page, the page is marked as a dirty page, and is added to a temporary swap cache; otherwise, another page is selected, until n pages are selected.

In a possible implementation, the n to-be-swapped-out pages may be selected during memory reclamation when there is insufficient memory.

In a possible implementation, the n to-be-swapped-out pages may be periodically selected by the system, and a period is set by the system.

In another possible implementation, an occasion for selecting the n to-be-swapped-out pages may be decided by the invoker.

In a possible implementation, after one to-be-swapped-out page is compressed, one compressed block is correspondingly obtained. When a compression ratio of a selected to-be-swapped-out page is lower than a threshold, the original page may be directly stored without being compressed, and the page whose compression ratio is lower than the threshold is managed together with a compressed block. The compression ratio threshold is set by the system.

In a possible implementation, the buffering the n compressed blocks in a compressed data buffer area includes: grouping the n compressed blocks into at least one group based on the group identifier, and buffering the at least one group in the compressed data buffer area, where compressed blocks included in each group have a same group identifier, and the group identifier includes an identifier of a process group corresponding to similar resource use behaviors, a process identifier, an application identifier, or an access time.

In a possible implementation, the organizing at least one of the n compressed blocks into m to-be-written units includes: organizing compressed blocks in one group into at least one to-be-written unit.

In a possible implementation, before the organizing at least one of the n compressed blocks into m to-be-written units, the method further includes: selecting a part of the at least one group based on a second indication, where the second indication includes the group identifier, the group identifier includes an identifier of a process group corresponding to similar resource use behaviors, a process identifier, an application identifier, or an access time, and the second indication is sent by the operating system or the application at the application layer.

The second indication further includes a quantity of compressed blocks or a to-be-swapped-out data volume, and the quantity of compressed blocks or the to-be-swapped-out data volume indicates a quantity of to-be-swapped-out compressed blocks in a group indicated by the group identifier or a volume of to-be-swapped-out data in the group indicated by the group identifier.

In a possible implementation, the organizing at least one of the n compressed blocks into m to-be-written units includes: organizing the at least one of the n compressed blocks into the m to-be-written units in descending order of compressed block sizes.

It can be understood that, the following can be learned from a reference relationship in the claims: There are two possible scenarios in this step. In one scenario, the at least one compressed block is a compressed block corresponding to a selected group indicated by a group identifier. In the other scenario, the at least one compressed block is a compressed block that is not grouped. In both scenarios, compressed blocks may be organized into a to-be-written unit in descending order of sizes.

Specifically, in the process of buffering the n compressed blocks in the compressed data buffer area, if a data volume of all compressed blocks in the compressed data buffer area is greater than or equal to a threshold, this case is notified to the invoker. The invoker determines whether to choose to swap out a compressed block to the swap area of the non-volatile storage device. If the invoker determines to choose to swap out a compressed block to the swap area of the non-volatile storage device, the invoker indicates, by using a group identifier, a group in which the to-be-swapped-out compressed block is located and also indicates a quantity x of compressed blocks. x compressed blocks that are least recently used and that are in the group indicated by the invoker are selected according to the LRU algorithm, where x is an integer greater than 0 and less than or equal to n; and the x compressed blocks are first sorted in descending order of sizes and then organized into at least one to-be-written unit.

It should be noted that, that the x compressed blocks are first sorted in descending order of sizes and then organized into a to-be-written unit means: The compressed blocks are sorted in descending order of sizes before being organized into the to-be-written unit, and then the to-be-written unit is stored based on a current space status corresponding to the to-be-written unit. However, this does not mean that a storage order of the compressed blocks in the finally written unit is a descending order of sizes. In a specific example, assuming that a memory management module specifies that 10 compressed blocks are to be swapped out, in this application, the 10 compressed blocks are sorted in descending order of data volumes: a compressed block 1, a compressed block 2, a compressed block 3, . . . , and a compressed block 10, and then the 10 compressed blocks are stored. In this case, a storage order of the 10 compressed blocks may be the compressed blocks 1, 2, 3, 6, 4, 5, 7, 10, 8, and 9. For details thereof, refer to a description in Embodiment 1.

In a possible implementation, in the process of buffering the n compressed blocks in the compressed data buffer area, if a data volume of all compressed blocks in the compressed data buffer area is greater than or equal to a threshold, this case is notified to the invoker. The invoker determines whether to choose to swap out a compressed block to the swap area of the non-volatile storage device. If the invoker determines to choose to swap out a compressed block to the swap area of the non-volatile storage device, the invoker indicates, by using a group identifier, a group in which the to-be-swapped-out compressed block is located and also indicates a to-be-swapped-out data volume. Compressed blocks that are least recently used and that are in the group indicated by the invoker are sequentially selected in ascending order of use frequencies according to the LRU algorithm, until a total data volume of the selected compressed blocks is less than or equal to and is closest to the to-be-swapped-out data volume size. Assuming that a corresponding quantity of compressed blocks in this case is x, the x compressed blocks are first sorted in descending order of sizes and then organized into at least one to-be-written unit.

It should be noted that, that the x compressed blocks are first sorted in descending order of sizes and then organized into a to-be-written unit means: The compressed blocks are sorted in descending order of sizes before being organized into the to-be-written unit, and then the to-be-written unit is stored based on a current space status corresponding to the to-be-written unit. However, this does not mean that a storage order of the compressed blocks in the finally written unit is a descending order of sizes. In a specific example, assuming that a memory management module specifies that 10 compressed blocks are to be swapped out, in this application, the 10 compressed blocks are sorted in descending order of data volumes: a compressed block 1, a compressed block 2, a compressed block 3, . . . , and a compressed block 10, and then the 10 compressed blocks are stored. In this case, a storage status of the 10 compressed blocks may be the compressed blocks 1, 2, 3, 6, 4, 5, 7, 10, 8, and 9. For details thereof, refer to a description in Embodiment 1.

In a possible implementation, in the process of buffering the n compressed blocks in the compressed data buffer area, if a data volume of all compressed blocks in the compressed data buffer area is greater than or equal to a threshold, this case is notified to the invoker. The invoker determines whether to choose to swap out a compressed block to the swap area of the non-volatile storage device. If the invoker determines to choose to swap out a compressed block to the swap area of the non-volatile storage device, the invoker indicates, by using a group identifier, a group in which the to-be-swapped-out compressed block is located and also indicates a quantity of compressed blocks. x compressed blocks that are least recently used and that are in the group indicated by the invoker are selected according to the LRU algorithm, where x is an integer greater than 0 and less than or equal to n, and x is a quantity of compressed blocks that is determined by the invoker; and the x compressed blocks are first sorted in ascending order of use frequencies according to the LRU algorithm, and then organized into at least one to-be-written unit.

In a possible implementation, in the process of buffering the n compressed blocks in the compressed data buffer area, if a data volume of all compressed blocks in the compressed data buffer area is greater than or equal to a threshold, this case is notified to the invoker. The invoker determines whether to choose to swap out a compressed block to the swap area of the non-volatile storage device. If the invoker determines to choose to swap out a compressed block to the swap area of the non-volatile storage device, the invoker indicates, by using a group identifier, a group in which the to-be-swapped-out compressed block is located and also indicates a to-be-swapped-out data volume size. Compressed blocks that are least recently used and that are in the group indicated by the invoker are sequentially selected in ascending order of use frequencies according to the LRU algorithm, until a total data volume of the selected compressed blocks is less than or equal to and is closest to the to-be-swapped-out data volume size. Assuming that a corresponding quantity of compressed blocks in this case is x, the x compressed blocks are first sorted in ascending order of use frequencies according to the LRU algorithm, and then organized into at least one to-be-written unit.

It should be noted that, in this embodiment of this application, the x compressed blocks may alternatively be selected according to another algorithm, for example, an LFU algorithm. This is not limited in this application.

It should be noted that, sorting the compressed blocks in descending order of sizes or in ascending order of use frequencies according to the LRU algorithm is an optional step for improving storage space utilization. In an actual implementation process, the selected compressed blocks may be directly organized into at least one to-be-written unit without being sorted.

It should be noted that, for an interface provided in this embodiment of this application for swapping out a compressed block to the swap area of the non-volatile storage device, the invoker may decide to invoke the interface at any time. This is not limited in this application. That the invoker chooses to swap out a compressed block to the swap area of the non-volatile storage device when receiving information that the data volume of all the compressed blocks in the compressed data buffer area is greater than or equal to the threshold is only one of scenarios.

Specifically, a form of the to-be-written unit may be a temporary page. After the compressed blocks are sorted according to the foregoing method, the system allocates a temporary page, and then stores, in the temporary page one by one, the x to-be-swapped-out compressed blocks indicated by the invoker. If the space in the temporary page is insufficient, the system further allocates a new temporary page until all the x to-be-swapped-out compressed blocks indicated by the invoker are stored in the temporary pages. When storing each compressed block, the system queries whether all allocated temporary pages have space for storing the current compressed block, until a temporary page is found for the current compressed block. According to this step, the space in each temporary page can be fully utilized, thereby improving storage efficiency. When all the x to-be-swapped-out compressed blocks indicated by the invoker are stored in the temporary pages, a quantity y of the temporary pages is counted, and the y temporary pages are swapped out to the swap area of the non-volatile storage device. For example, the to-be-swapped-out compressed blocks occupy eight temporary pages. If there is a segment of 32K continuous space in the swap area, the eight pages are swapped out to the 32K space at a time. If there is no continuous space in the swap area, the eight temporary pages are swapped out to the swap area in eight batches in a worst case. According to the method, the to-be-swapped-out compressed blocks can be continuously stored, and are read/written in the swap-out process by using a to-be-written unit as a minimum unit. This reduces a quantity of read/write times, thereby reducing impact on a service life of the non-volatile storage device.

In a possible implementation, a form of the to-be-written unit may be a temporary swap sub-area, a size of the temporary swap sub-area is an integer quantity of pages, and the size of the temporary swap sub-area is set by the system. After the compressed blocks are sorted according to the foregoing method, the system allocates a temporary swap sub-area, and then stores, in the temporary swap sub-area one by one, the x to-be-swapped-out compressed blocks indicated by the invoker. If the space in the temporary swap sub-area is insufficient, the system further allocates a new temporary swap sub-area until all the x compressed blocks are stored. Assuming that a total quantity of temporary swap sub-areas is m in this case, the m temporary swap sub-areas correspond to m to-be-written units, and the m temporary swap sub-areas are written into the swap area of the non-volatile storage device in a maximum of m batches. For example, m=5, and a size of the temporary swap sub-area, that is, a size of the to-be-written unit, is 32 K. Assuming that there is a segment of 96 K continuous space in the swap area in this case and each of the remaining segments of space is 32 K continuous space, the five to-be-written units are written into the swap area in three batches. To be specific, three to-be-written units are written in one batch, and one to-be-written unit is written in each of the other two batches. It should be noted that, in this implementation, if a data volume of a to-be-swapped-out compressed block is less than a size of a temporary swap sub-area, the to-be-swapped-out compressed block may not be swapped out first; and after space in the temporary swap sub-area is used up, the compressed block in the temporary swap sub-area is swapped out to the swap area.

According to the method, the to-be-swapped-out compressed blocks can be continuously stored, and are read/written in the swap-out process by using a to-be-written unit as a minimum unit. This reduces a quantity of write times, thereby reducing impact on a service life of the non-volatile storage device.

In a possible implementation, before the writing the m to-be-written units into a swap area of a non-volatile storage device in a maximum of m batches, the method includes: creating a mapping table, where the mapping table includes a correspondence between a page identifier of the at least one compressed block and a swap area address corresponding to the at least one compressed block, the page identifier is an identifier of at least one to-be-swapped-out page corresponding to the at least one compressed block, the swap area address is an address of a segment of space that belongs to the swap area and that is allocated to the at least one compressed block, and the mapping table is used to obtain the swap area address during page swap-in by using the page identifier.

In a possible implementation, after the m to-be-written units are written into the swap area of the non-volatile storage device in a maximum of m batches, space in the swap cache is released. The space includes space in all the temporary pages or all the temporary swap sub-areas described above and space of the to-be-swapped-out compressed blocks in the compressed data buffer area.

In a possible implementation, a use status of the swap area of the non-volatile storage device may be maintained by using a swap area management structure, for example, an array; and an address of a compressed block in the swap area of the non-volatile storage device may be described by using a triplet <start address of a swap sub-area, compressed block offset, compressed block length>. In this way, a compressed block of any length can be addressed.

Specifically, the swap area of the entire non-volatile storage device is a partition, and the swap area is divided into a series of swap sub-areas. With reference to the foregoing description, it can be learned that, the compressed blocks are organized into at least one to-be-written unit during swap-out, and a size of each to-be-written unit is the same as that of a swap sub-area. In this way, one to-be-written unit can be written into one swap sub-area. If the compressed blocks are organized into m to-be-written units during swap-out, and there is a segment of continuous space of a size of the m to-be-written units in the swap area of the non-volatile storage device, on a premise that the size of the m to-be-written units is less than a maximum read/write volume in one I/O, the m to-be-written units may be written into the swap area at a time. This reduces a quantity of read/write times, thereby reducing impact on a service life of the non-volatile storage device in a memory swapping process. The maximum read/write volume in one I/O is related to a limitation on the non-volatile storage device.

In a possible implementation, the swap area of the entire non-volatile storage device swap area is a file, and a segment of space that belongs to the swap area and that is allocated to the at least one compressed block includes a segment of continuous space that is allocated from the file to store a swapped-out compressed block.

In a possible implementation, this embodiment of this application further includes requesting to perform page swap-in. This step includes: obtaining, from the mapping table based on a page identifier of a page that is requested to be swapped in, a swap area address corresponding to the page identifier of the page that is requested to be swapped in; and reading a compressed block from the obtained swap area address, and storing the compressed block in the compressed data buffer area.

In a possible implementation, an occasion for requesting to perform page swap-in is determined by the invoker, and includes an occasion when a page fault exception is triggered in a case in which a page to be accessed by a process does not exist in a memory.

Specifically, the requesting to perform page swap-in includes: obtaining a page identifier of a page that is requested to be swapped in; determining whether the page that is requested to be swapped in is in the compressed data buffer area; and if the page that is requested to be swapped in is in the compressed data buffer area, finding a compressed block corresponding to the page identifier based on the page identifier of the page that is requested to be swapped in, decompressing, into specified space, the compressed block corresponding to the page that is requested to be swapped in, where the specified space may be allocated by the invoker during requesting to perform page swap-in, and releasing space that is in the compressed data buffer area and in which the compressed block corresponding to the page that is requested to be swapped in is located; or reading the requested compressed block from the swap area of the non-volatile storage device if the page that is requested to be swapped in is not in the compressed data buffer area. A possible implementation of the determining whether the page that is requested to be swapped in is in the compressed data buffer area is: determining, by using a flag bit in the page identifier, whether the page that is requested to be swapped in is in the memory; if the page that is requested to be swapped in is not in the memory, determining that the page that is requested to be swapped in may be in the compressed data buffer area or in the swap area of the non-volatile storage device; and then determining, based on the mapping table, whether the page that is requested to be swapped in is in the compressed data buffer or in the swap area of the non-volatile storage device.

In a possible implementation, the reading, from the swap area of the non-volatile storage device, the compressed block corresponding to the page that is requested to be swapped in, if the page that is requested to be swapped in is not in the compressed data buffer area includes: obtaining, from the mapping table based on the page identifier of the page that is requested to be swapped in, the swap area address corresponding to the page identifier of the page that is requested to be swapped in; and reading the compressed block from the obtained swap area address, and storing the compressed block in the compressed data buffer area.

In a possible implementation, the reading, from the swap area of the non-volatile storage device, the compressed block corresponding to the page that is requested to be swapped in, if the page that is requested to be swapped in is not in the compressed data buffer area includes: obtaining, from the mapping table based on the page identifier of the page that is requested to be swapped in, the swap area address corresponding to the page identifier of the page that is requested to be swapped in; and reading, from the obtained swap area address, a to-be-written unit in which the compressed block is located, and storing the to-be-written unit in the compressed data buffer area.

In a possible implementation, during reading of the to-be-written unit in which the compressed block is located, a status of the to-be-written unit is marked as "being swapped in". In this implementation, one to-be-written unit/swap sub-area can be prevented from being simultaneously read a plurality of times, thereby indirectly reducing a quantity of read/write times, improving swapping efficiency, and reducing impact on a service life of the non-volatile storage device. It can be understood that, during reading of the to-be-written unit in which the compressed block is located, a status of the to-be-written unit may not be marked as "being swapped in".

In a possible implementation, this embodiment of this application further includes: deleting a mapping entry corresponding to the page identifier of the page that is requested to be swapped in, and releasing space of the compressed block or the to-be-written unit/swap sub-area in the swap area of the non-volatile storage device.

In this method, data in the entire swap sub-area in which the requested compressed block is located is read from the swap area of the non-volatile storage device into the compressed data buffer area, so that data can be read in batches. This reduces a quantity of read times, thereby reducing impact on a service life of the non-volatile storage device.

In a possible implementation, the releasing space of the compressed block or the swap sub-area in the swap area of the non-volatile storage device may be implemented by setting the corresponding space of the compressed block or the swap sub-area to be idle in a swap area management structure such as an array.

In another possible implementation, the requesting to perform page swap-in may be performed on an occasion when it is predicted that a page in a specific group is to be accessed. The prediction may be determined based on a user behavior habit or an application history by using a regularly trained model, for example, determined by performing matching with the model based on a time period in which an application is used, a geographical location, a use frequency of the application, and a status of an electronic device such as a network connection status. The process of requesting to perform page swap-in is the same as that described above.

It should be noted that, whether to perform page swap-in and when to perform page swap-in may be determined by the invoker; and the requesting to perform page swap-in when a page fault exception is triggered in a case in which a page to be accessed by a process does not exist in a memory and the requesting to perform page swap-in when it is predicted that a page in a specific group is to be accessed are only two of scenarios. This is not limited in this application.

According to a second aspect, based on the method provided in this application, an embodiment of this application further provides a memory swapping apparatus. The apparatus includes a module for implementing one or more steps in the method. The module may be implemented by software or a combination of software and hardware.

According to a third aspect, an embodiment of this application provides a terminal. The computer device includes a processor and a memory. The memory is configured to store a software program. The processor is configured to: read the software program stored in the memory, and perform the method provided in any implementation of the first aspect.

According to a fourth aspect, an embodiment of this application provides a storage medium. The storage medium includes a computer program. When being run on one or more processors, the computer program is used to implement the method provided in any implementation of the first aspect.

According to a fifth aspect, an embodiment of this application provides a computer program product. The computer program product includes a computer program. When being run on one or more processors, the computer program is used to implement the method provided in any implementation of the first aspect.

BRIEF DESCRIPTION OF DRAWINGS

To describe the technical solutions in embodiments of this application or in a conventional technology more clearly, the following briefly describes the accompanying drawings required for describing embodiments or the conventional technology. It is clear that the accompanying drawings in the following description show some embodiments of this application, and a person of ordinary skill in the art may still derive other drawings from these accompanying drawings without creative efforts.

DESCRIPTION OF EMBODIMENTS

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

In the descriptions of embodiments of this application, unless otherwise stated, "a plurality of" means two or more than two. The term "and/or" or the character "/" in this application describes only an association relationship for describing associated objects and represents that three relationships may exist. For example, A and/or B may represent any one of the following three cases: Only A exists, both A and B exist, or only B exists.

A memory swapping method provided in embodiments of this application is mainly applied to a terminal device that uses an operating system with a Linux kernel. The terminal device may also be referred to as user equipment (UE), a mobile station (MS), a mobile terminal, or the like. Optionally, the terminal device may have a capability of communicating with one or more core networks through a radio access network (RAN). For example, the terminal device may be a mobile phone (or is referred to as a "cellular" phone) or a computer with a mobile property. For example, the terminal may alternatively be a portable, pocket-sized, hand-held, computer built-in, or vehicle-mounted mobile apparatus. It should be understood that, in addition to the terminal device, the memory swapping method provided in embodiments of this application may also be applied to other types of computer systems, for example, a household appliance or a server.

Figure 1:
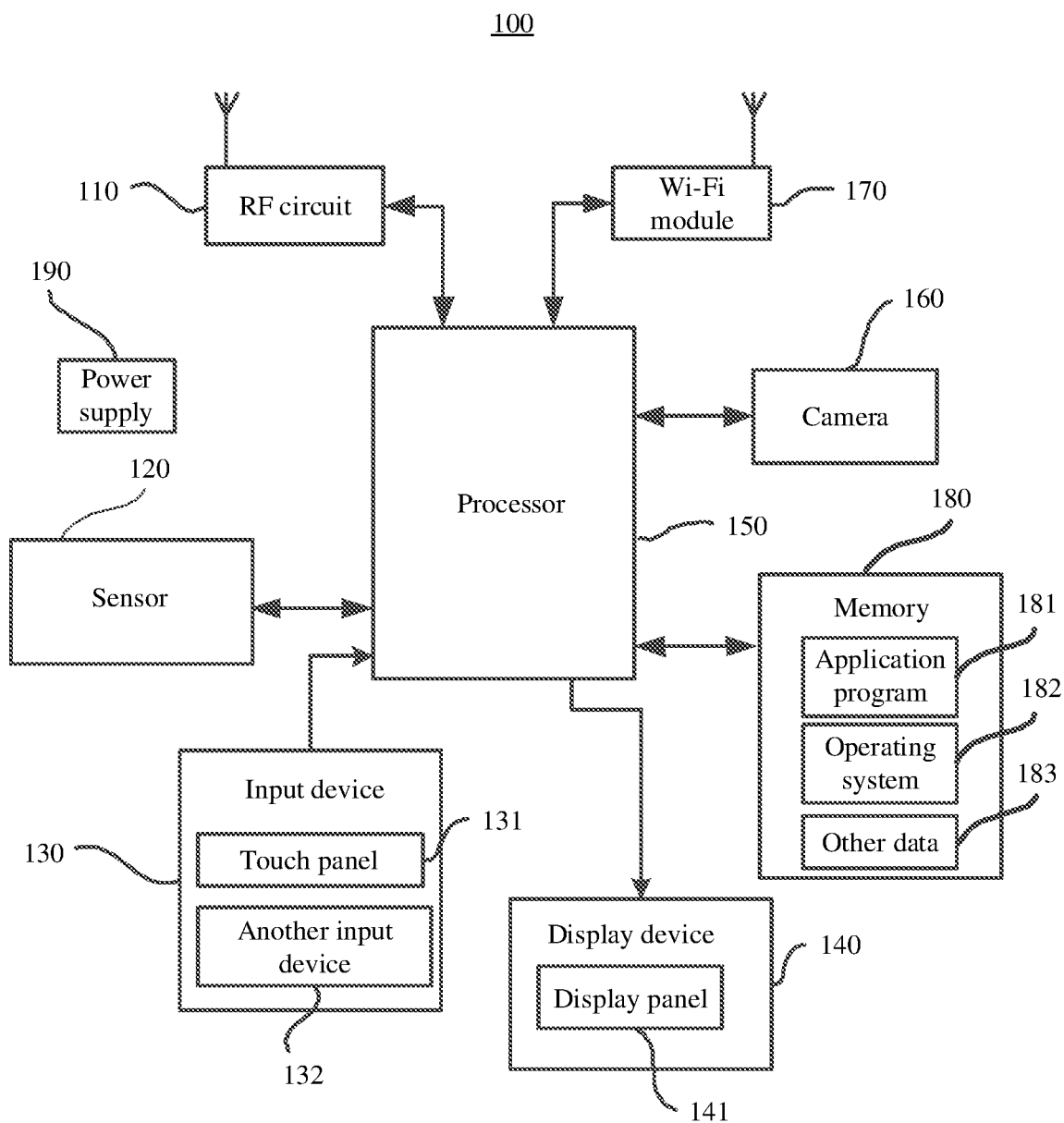
FIG. 1 is a schematic diagram of a structure of a terminal device applied to an embodiment of this application.

FIG. 1 is a schematic diagram of a structure of a terminal device applied to an embodiment of this application. As shown in FIG. 1, a terminal device 100 includes a memory 180, a processor 150, and a display device 140. The memory 180 stores a computer program, and the computer program includes an operating system program 182, an application program 181, and the like. The processor 150 is configured to read the computer program from the memory 180, and then perform a method defined by the computer program. For example, the processor 150 reads the operating system program 182 to run an operating system on the terminal device 100 and implement various functions of the operating system; or reads one or more application programs 181 to run an application on the terminal device.

The processor 150 may include one or more processors. For example, the processor 150 may include one or more central processing units, or include one central processing unit and one graphics processing unit. When the processor 150 includes the plurality of processors, the plurality of processors may be integrated into a same chip, or each of the plurality of processors may be an independent chip. One processor may include one or more processing cores.

In addition, the memory 180 further stores data 183 other than the computer program. The data 183 may include data generated after the operating system program 182 or the application program 181 is run, and the data includes system data (for example, a configuration parameter of the operating system) and user data. For example, data buffered by an application enabled by a user is typical user data.

The memory 180 usually includes an internal memory and an external memory. The memory may be a random access memory (RAM), a read-only memory (ROM), a cache, or the like. The external memory may be a hard disk, an optical disc, a USB flash drive, a floppy disk, a flash memory, a tape drive, or the like. The computer program is usually stored in the external memory. Before performing processing, the processor loads the computer program from the external memory to the memory. In this embodiment, a swap area of a non-volatile storage device is a space in the external memory. If a page fault exception occurs, a corresponding page is swapped from the external memory to the internal memory.

The operating system program 182 includes a computer program that can implement a memory swapping method provided in embodiments of this application, so that after the processor 150 reads the operating system program 182 and runs the operating system, the operating system can have a swap-in function and/or a swap-out function provided in embodiments of this application. Further, the operating system may open, to an upper-layer invoker, an interface for invoking the swap-in function and/or the swap-out function. After reading the application program 181 from the memory 180 and running the application program 181, the processor 150 may implement memory swapping by invoking the interface.

The terminal device 100 may further include an input device 130, configured to receive input digital information or character information, a contact touch operation/non-contact gesture, generate signal input that is related to user settings and function control of the terminal device 100, and the like.

The terminal device 100 may further include the display device 140. The display device 140 includes: a display panel 141, configured to display information entered by the user or information provided for the user, various menu interfaces of the terminal device 100, and the like. In some other embodiments, a touch panel 131 may cover the display panel 141 to form a touch display screen.

In addition, the terminal device 100 may further include a power supply 190 configured to supply power to other modules, and a camera 160 configured to shoot a photo or a video. The terminal device 100 may further include one or more sensors 120, for example, an acceleration sensor or a light sensor. The terminal device 100 may further include a radio frequency (RF) circuit 110 configured to perform network communication with a wireless network device, and may further include a Wi-Fi module 170 configured to perform Wi-Fi communication with another device.

The following embodiments describe the memory swapping method provided in embodiments of this application. The memory swapping method includes page swap-out and page swap-in. The memory swapping method provided in embodiments of this application may be implemented in the operating system program 182 shown in FIG. 1. A swap area that is mentioned in embodiments of this application and that is of a non-volatile storage device may be a flash memory.

Figure 2:
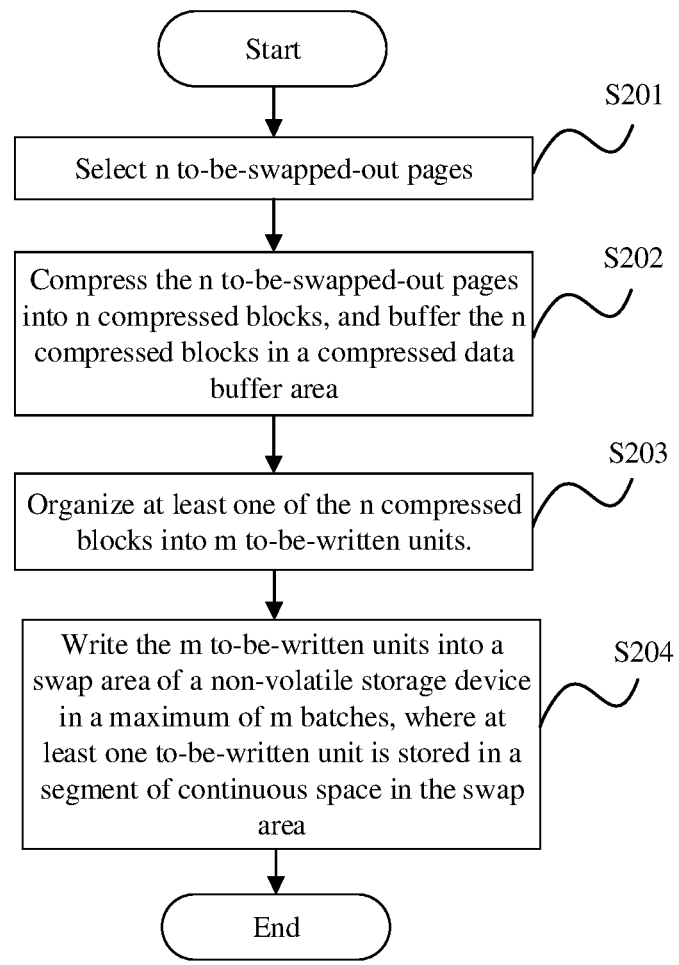
FIG. 2 is a schematic flowchart of a memory swapping method according to an embodiment of this application.

For page swap-out:

FIG. 2 is a schematic flowchart of a memory swapping method according to an embodiment of this application. The method includes the following steps.

Step S201: Select n to-be-swapped-out pages.

Step S202: Compress the n to-be-swapped-out pages into n compressed blocks, and buffer the n compressed blocks in a compressed data buffer area.

Step S203: Organize at least one of the n compressed blocks into m to-be-written units.

Step S204: Write the m to-be-written units into the swap area of the non-volatile storage device in a maximum of m batches, where at least one to-be-written unit is stored in a segment of continuous space in the swap area.

Figure 10A:
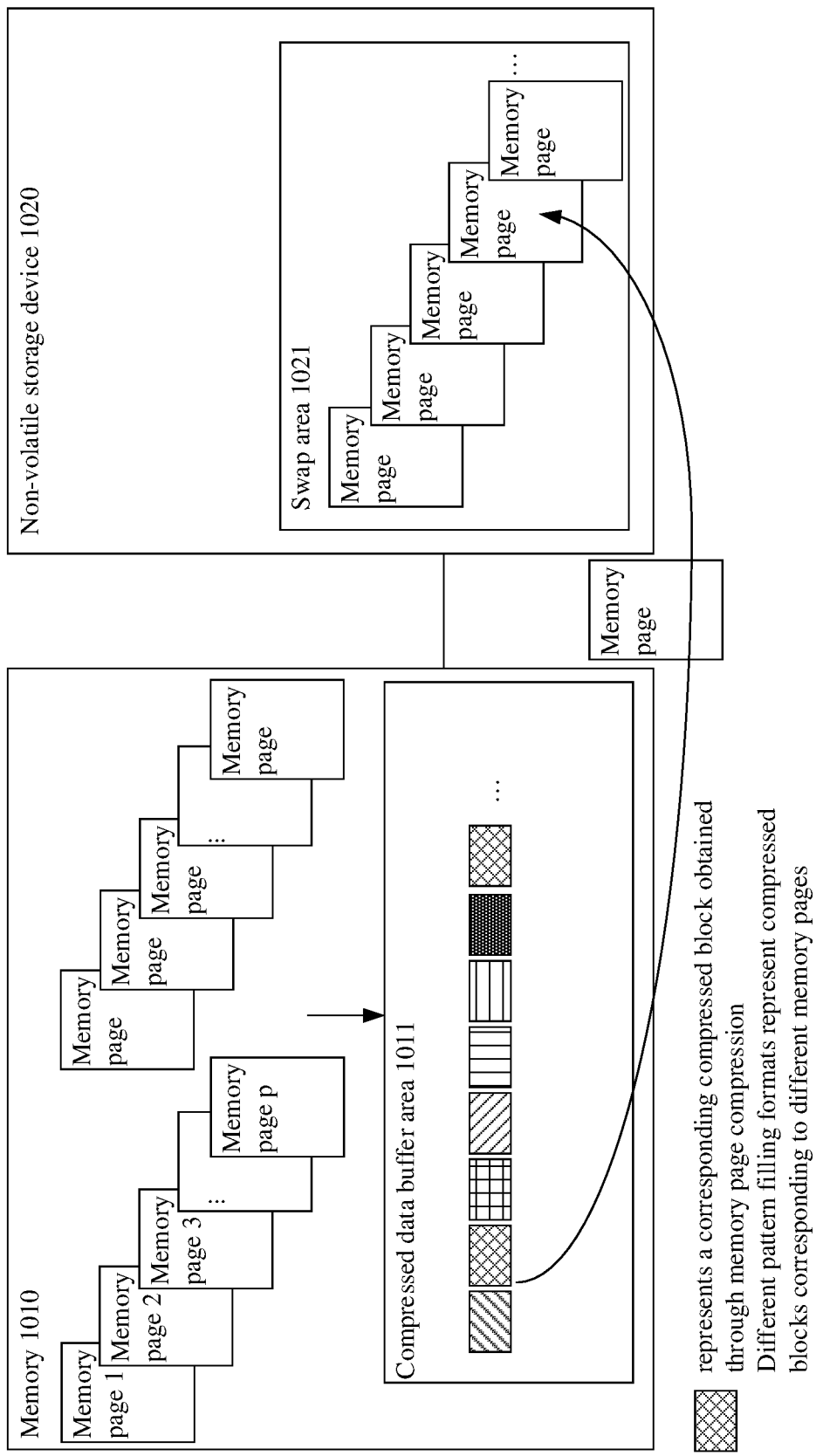
FIG. 10a is a schematic diagram of an example of memory swapping performed by using a swap mechanism.
Figure 10B:
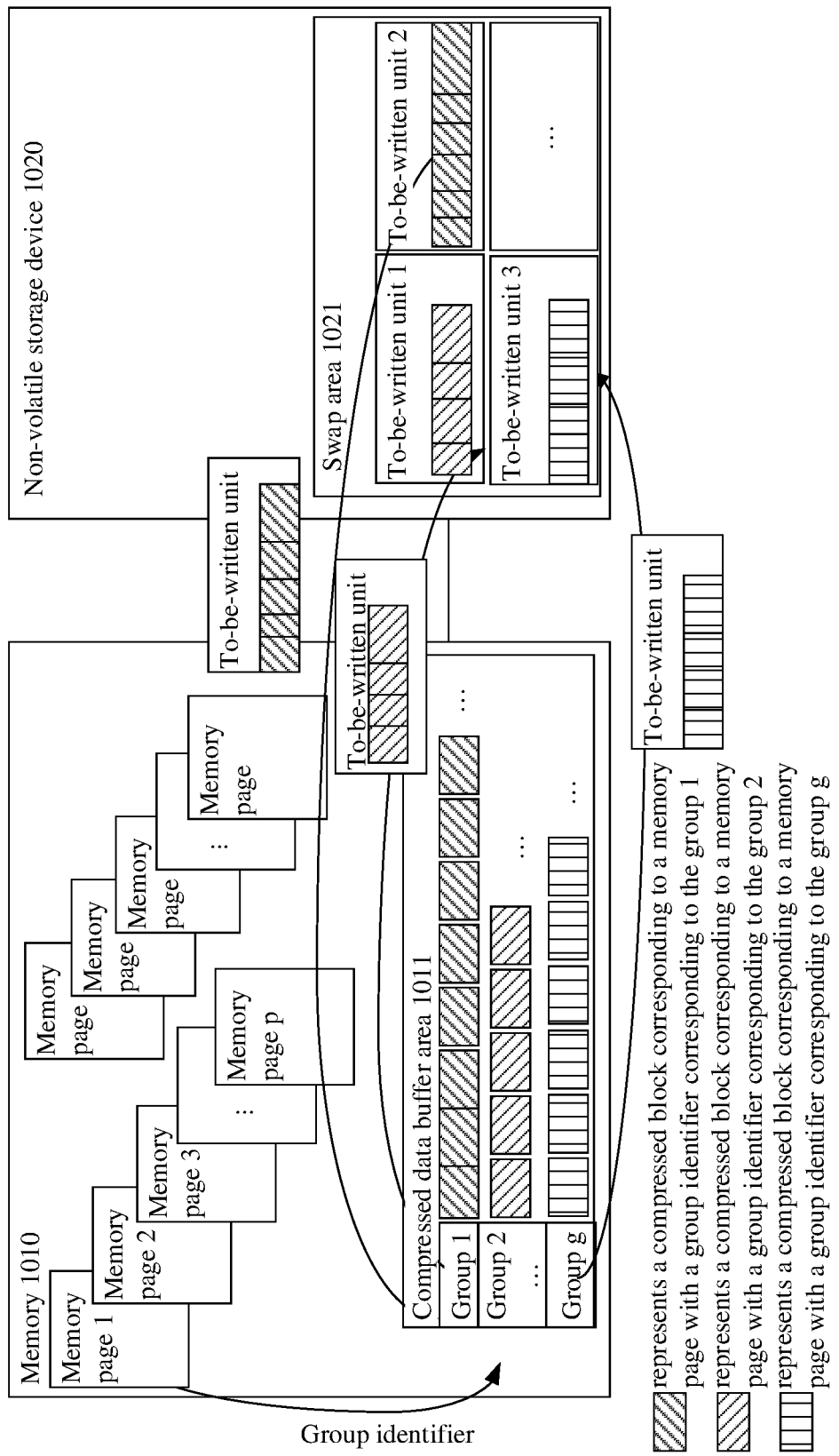
FIG. 10b is a schematic diagram of an example of a memory swapping method according to an embodiment of this application.

Specifically, FIG. 10b is a schematic diagram of an example of a memory swapping method according to an embodiment of this application.

After n to-be-swapped-out pages are selected from a memory 1010, each to-be-swapped-out page is compressed into a compressed block, and the compressed blocks are grouped into a group 1, a group 2, . . . , and a group g based on a group identifier such as a process identifier, and buffered in a compressed data buffer area 1011. Memory pages with a same group identifier are buffered in a same group after being compressed. As shown in FIG. 10b, compressed blocks with a same group identifier are identified by using a same pattern filling format. For example, a block in an upper diagonal filling format represents a compressed block obtained through compression of a memory page with a group identifier corresponding to the group 1. A block in a lower diagonal filling format represents a compressed block obtained through compression of a memory page with a group identifier corresponding to the group 2. A block in a vertical line filling format represents a compressed block obtained through compression of a memory page with a group identifier corresponding to the group g. When invoking the method, an invoker instructs to swap out n compressed blocks corresponding to the group 1. In this case, then compressed blocks are organized into m to-be-written units, and are written into a swap area 1021 of a non-volatile storage device 1020 in a maximum of m batches. The n compressed blocks are written in a maximum of m batches because there may be a segment of continuous space of a size of a plurality of to-be-written units, for example, five to-be-written units, in the swap area 1021. In this case, the five to-be-written units may be written into the swap area 1021 at a time. It should be noted that, an upper limit of a volume of data written at a time is an upper limit of a read/write volume in one I/O, and the upper limit is affected by a limitation on the non-volatile storage device.

For comparison, refer to FIG. 10a. FIG. 10a is a schematic diagram of an example of memory swapping performed by using a swap mechanism. That there is insufficient memory is used as an example. When there is insufficient memory, a to-be-swapped-out page is swapped out from the memory 1010 according to an LRU algorithm, and the to-be-swapped-out page is compressed into a compressed block and written into the compressed data buffer area 1011. As shown in FIG. 10a, blocks in different pattern filling formats are used to represent compressed blocks corresponding to different to-be-swapped-out pages. When a data volume of the compressed data buffer area reaches a threshold, a compressed block is selected according to the LRU algorithm and is decompressed, and then is swapped out to the swap area 1021 of the non-volatile storage device 1020.

The to-be-swapped-out page may be selected during memory reclamation when there is insufficient memory, or may be periodically selected by a system. The selection is triggered by the invoker.

Specifically, in this procedure, two interfaces are provided to the invoker in this embodiment; in other words, the invoker decides whether to swap out a page to the compressed data buffer area or swap out a compressed block to the swap area of the non-volatile storage device. The invoker may be a memory management module, a process management module, or an application framework of an operating system. In a Linux operating system kernel, modules in this embodiment include mem_cgroup, kswapd, zswap/zram, f2fs/non-volatile storage device driver, and the like. Details thereof are as follows:

In the mem_cgroup module, a mem_cgroup-based grouping manner is modified in this embodiment. In this way, mem_cgroup-based grouping is implemented based on a process, and whether to perform grouping based on a process, an application, or the like may be determined through configuration.

In the kswapd module, a function of swapping together some or all of pages in one group, for example, some or all of pages corresponding to one process, is added in this embodiment.

In the zswap/zram module, a function of grouping compressed data based on mem_cgroup and swapping out pages in one group to the swap area of the non-volatile storage device together is added in this embodiment.

If swapped-out data is read/written by using a swap file, a swap file read/write module and an address management module are implemented based on an f2fs file system. If swapped-out data is read/written by using the swap area of the non-volatile storage device, a swap file read/write module and an address management module are implemented based on the existing non-volatile storage device driver module.

The following uses an example in which the non-volatile storage device is a flash memory to describe in detail the steps in the memory swapping method provided in this embodiment.

Figure 3:
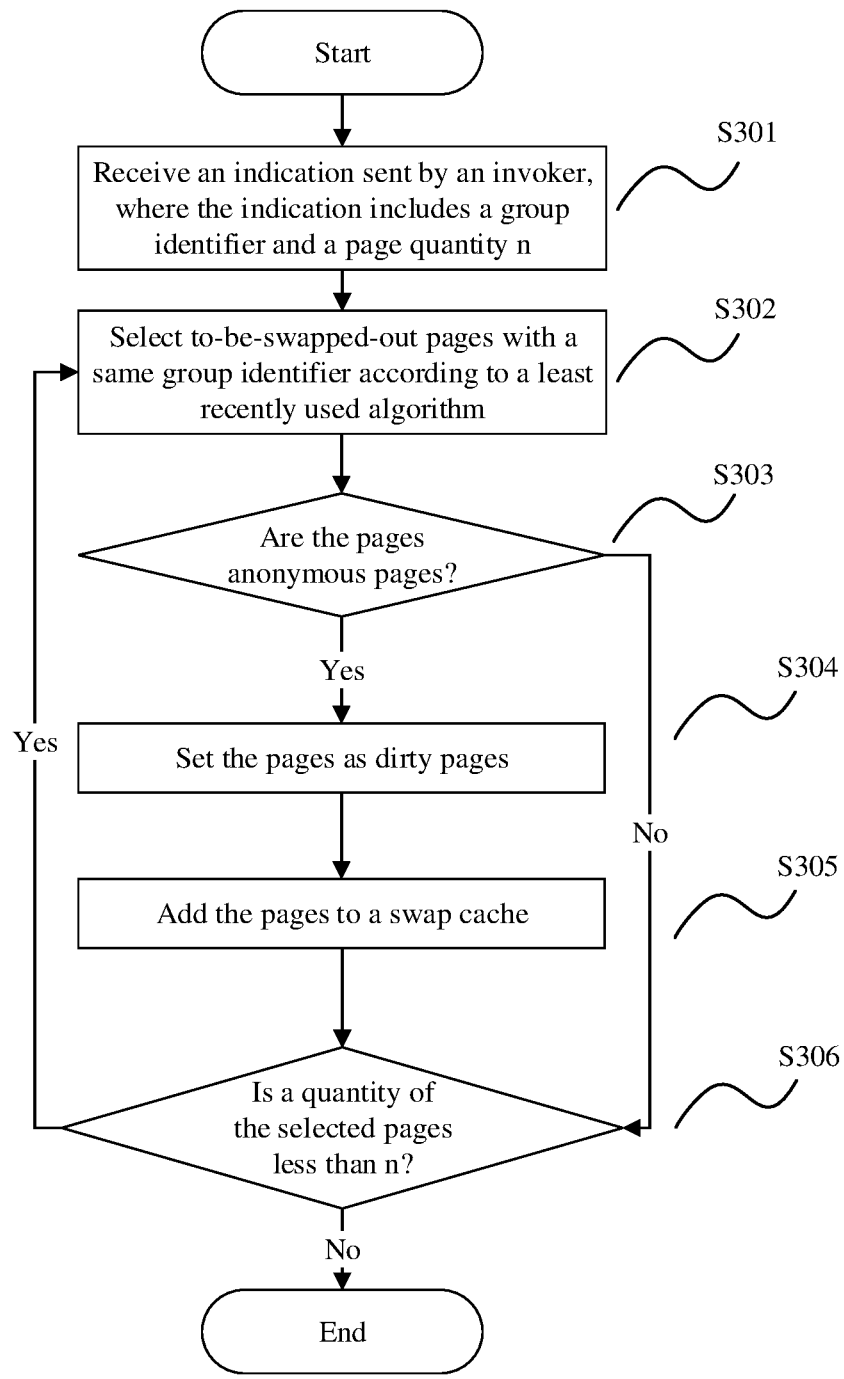
FIG. 3 is a schematic flowchart of selecting a to-be-swapped-out page according to an embodiment of this application.

FIG. 3 is a specific schematic flowchart of step S201 of selecting a specified quantity of associated to-be-swapped-out pages in the memory swapping method according to this embodiment. Step S201 includes the following procedure.

Step S301: Receive an indication sent by an invoker, where the indication includes a group identifier and a page quantity n.

Step S302: Select pages with a same group identifier according to a least recently used algorithm.

Step S303: For each selected page, determine whether the page is an anonymous page.

If the page is the anonymous page, step S304 is performed.

If the page is not the anonymous page, step S306 is performed.

Step S304: Set the page as a dirty page.

Step S305: Add the page to a swap cache.

Step S306: Determine whether a quantity of the selected pages is less than n.

If the quantity of the selected pages is less than n, step S302 continues to be performed.

If the quantity of the selected pages is not less than n, the procedure ends.

Specifically, for example, mem_cgroup is configured to perform grouping based on an application. When an activity manager in the application framework finds that an application A is frozen, it indicates that a probability that the application A is used again in a short time is relatively low. In this case, an interface provided in this application is invoked, and an application identifier of the application A and the quantity n of pages that need to be swapped out are notified to a swapping module in this embodiment. The swapping module in this embodiment selects n anonymous pages of the application A in ascending order of page use frequencies according to the LRU algorithm, and marks all of the n anonymous pages as dirty pages and adds the n anonymous pages to the swap cache.

For another example, mem_cgroup is configured to perform grouping based on a process. When the memory management module finds that there is insufficient memory in the system, an interface provided in this application is invoked, and a process A and the quantity n of pages that need to be swapped out are notified in this embodiment according to a memory reclamation policy determined by the memory management module. In this embodiment, n anonymous pages of the process A are selected in ascending order of page use frequencies according to the LRU algorithm, and the n anonymous pages are all marked as dirty pages and added to the swap cache.

Figure 4:
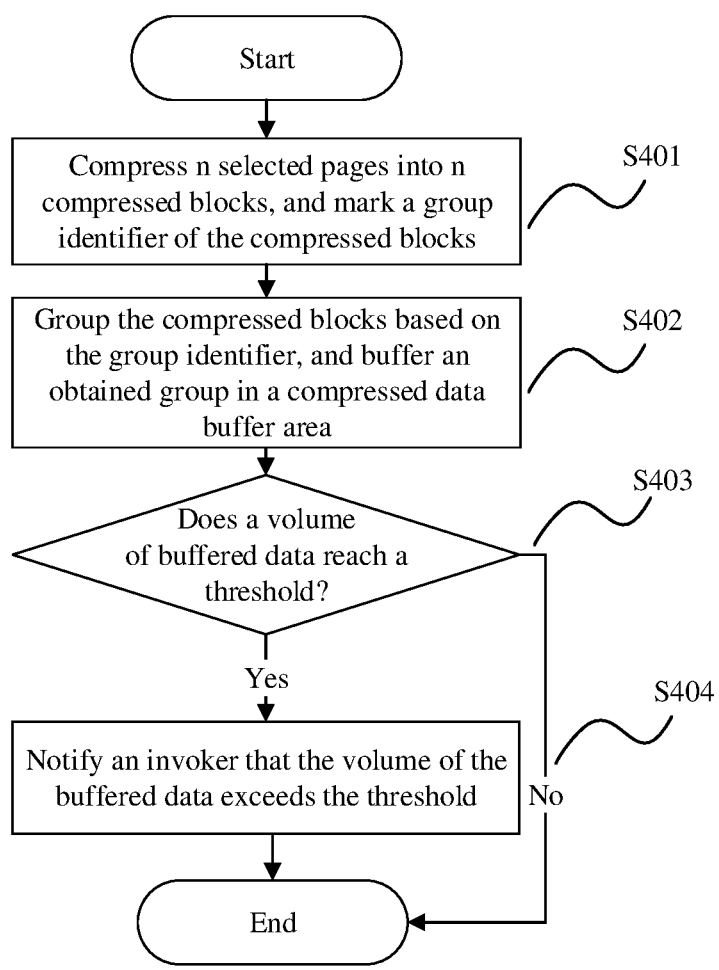
FIG. 4 is a schematic flowchart of compressing a selected to-be-swapped-out page into a compressed block and grouping the compressed block based on a group identifier of the page according to an embodiment of this application.

FIG. 4 is a specific schematic flowchart of compressing the n to-be-swapped-out pages into n compressed blocks, grouping the n compressed blocks based on a group identifier of the pages, and buffering an obtained group in the compressed data buffer area in step S202 in the memory swapping method according to this embodiment. Step 202 includes the following procedure.

Step S401: Compress the selected pages into compressed blocks, and mark a group identifier of the compressed blocks.

Step S402: Group the compressed blocks based on the group identifier, and buffer an obtained group in the compressed data buffer area.

Step S403: Determine whether a volume of buffered data in the compressed data buffer area reaches a threshold.

If the volume of the buffered data in the compressed data buffer area reaches the threshold, an invoker is notified that the volume of the buffered data exceeds the threshold.

If the volume of the buffered data in the compressed data buffer area does not reach the threshold, the procedure ends.

In this procedure, the foregoing n anonymous pages are compressed one by one, and stored in the compressed data buffer area based on a group identifier. In the storage process, whether a volume of buffered data in the compressed data buffer area reaches the threshold is determined; and if the volume of the buffered data has reached the threshold, the memory management module is notified that the volume of the buffered data exceeds the threshold, and the memory management module decides whether to swap out a compressed block in the compressed data buffer area to the swap area of the non-volatile storage device. If the memory management module determines that a compressed block needs to be swapped out to the swap area of the non-volatile storage device, the memory management module performs the following procedure corresponding to S203 and S204.

For step S203 and step S204 in the memory swapping method provided in this embodiment of this application (namely, organizing at least one of the n compressed blocks into m to-be-written units; and writing the m to-be-written units into the swap area of the non-volatile storage device in a maximum of m batches, where at least one to-be-written unit is stored in a segment of continuous space in the swap area), the procedure is described in this embodiment of this application by using two specific application scenarios.

Application scenario 1: A size of a to-be-written unit is one page.

A selected compressed block is swapped out to continuous space in the swap area of the non-volatile storage device in a form of a compressed page. The compressed page herein is a page used to temporarily store a selected compressed block, and a size of one compressed page is a size of one memory page, namely, 4 K. The selected compressed block may occupy a plurality of compressed pages, and the plurality of compressed pages are swapped out to the contiguous space in the swap area of the non-volatile storage device together.

Swapping out a selected compressed block to continuous space in the swap area of the non-volatile storage device in a form of a compressed page is described in detail below by using a specific embodiment.

Figure 5A:
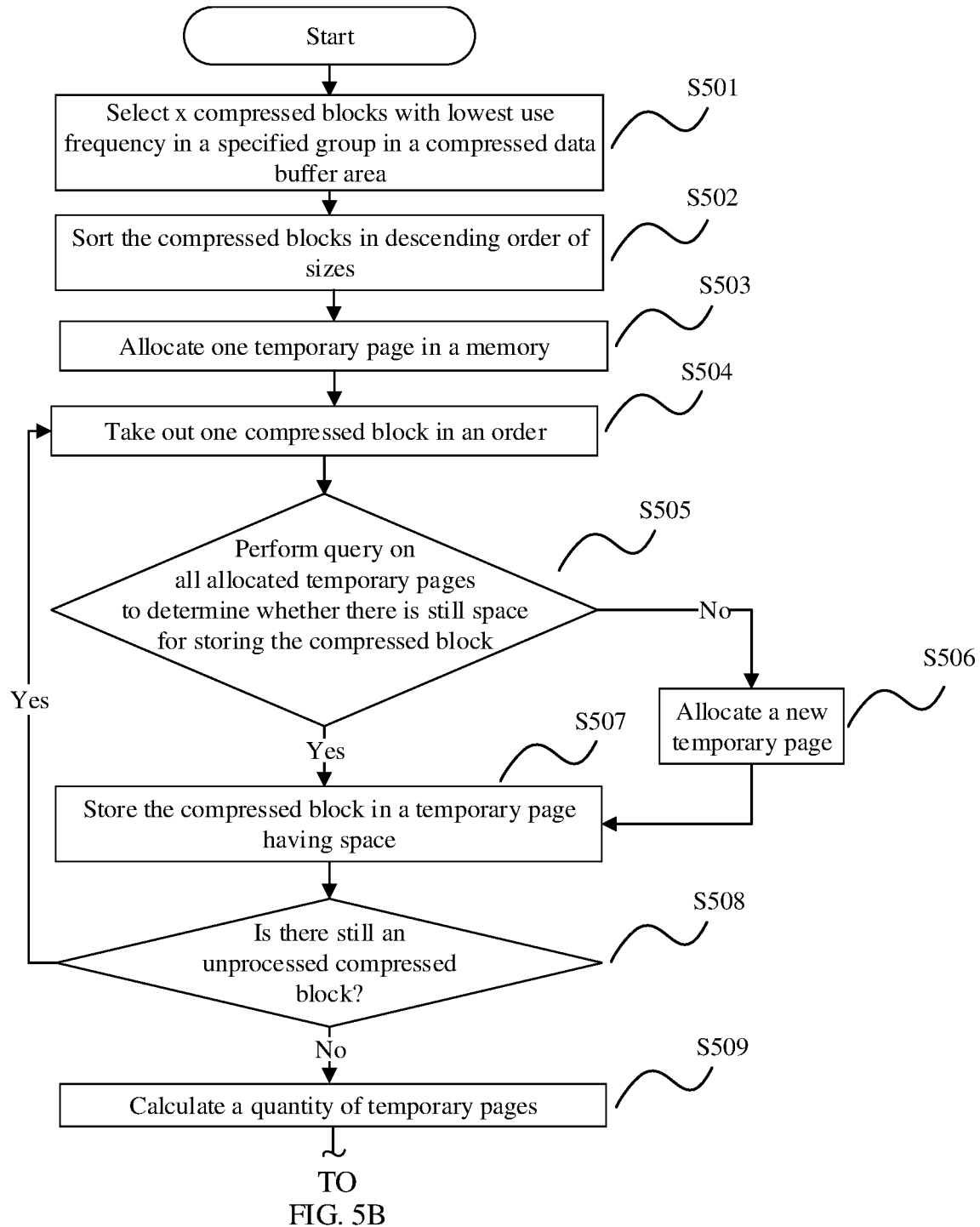
FIG. 5A and FIG. 5B are a schematic flowchart of organizing a selected compressed block into a form of a compressed page and swapping the compressed block into continuous space in a swap area of a non-volatile storage device according to an embodiment of this application.
Figure 5B:
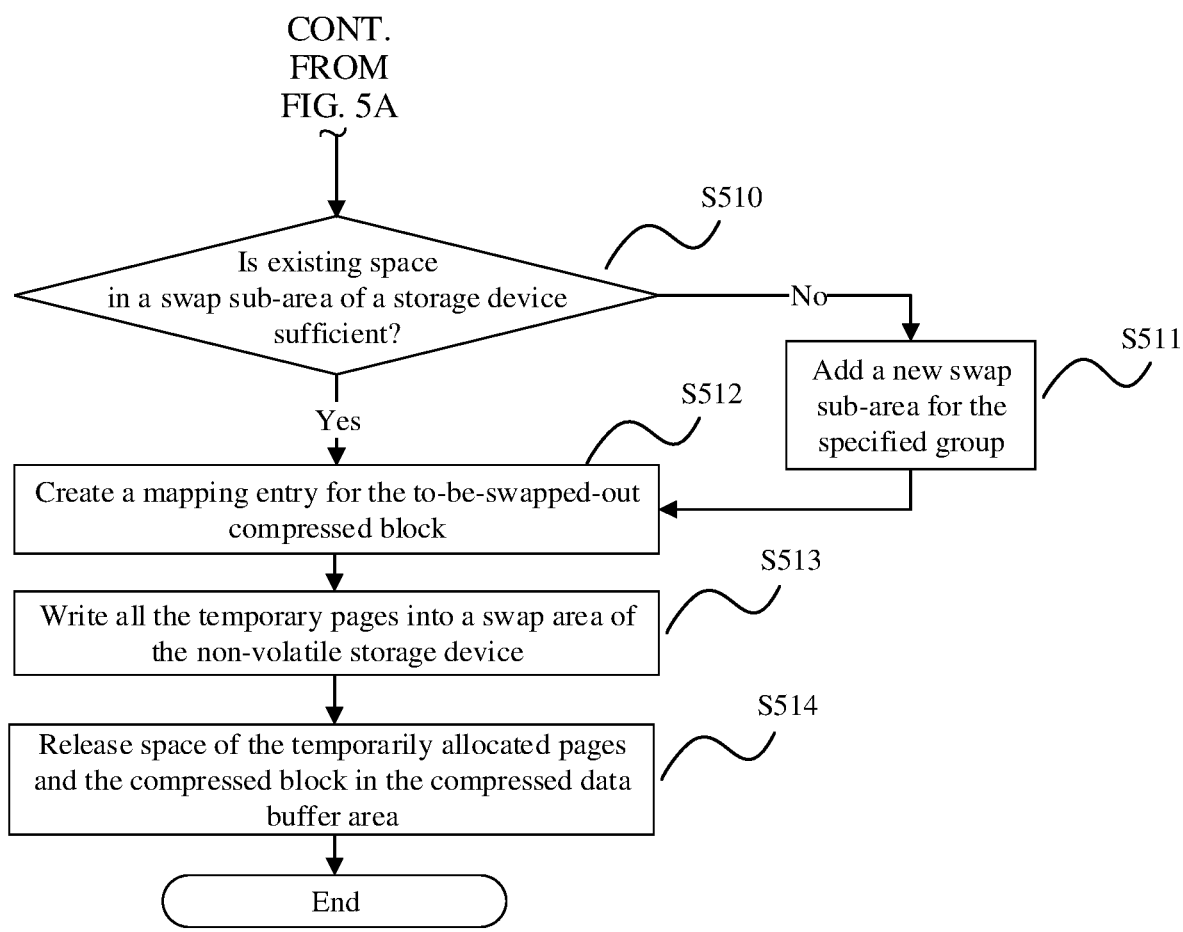

Embodiment 1: FIG. 5A and FIG. 5B are a schematic flowchart of swapping out a selected compressed block to continuous space in the swap area of the non-volatile storage device in a form of a compressed page. In this embodiment, a to-be-written unit is one compressed page. This embodiment includes the following procedure.

Step S501: Select x compressed blocks with a lowest use frequency that correspond to a specified process and that are in the compressed data buffer area, where x is a quantity of compressed blocks that is determined by an invoker, or a total data volume of the x compressed blocks is less than or equal to and is closest to a volume that is of to-be-swapped-out data and that is determined by the invoker.

Step S502: Sort the compressed blocks in descending order of sizes.

Step S503: Allocate a temporary page in a memory, where the temporary page is used to store the compressed blocks, so that the compressed blocks can be swapped out to continuous space in the swap area of the non-volatile storage device in batches subsequently.

Step S504: Take out one compressed block in an order.

Step S505: Perform query on all allocated temporary pages to determine whether there is still space for storing the compressed block.

If there is no space for storing the compressed block, the following step S506 is performed: Allocate a new temporary page. Then, step S507 continues to be performed.

If there is space for storing the compressed block, step S507 is performed.

Step S507: Store the compressed block in a temporary page having space, and continue to perform step S508.

Step S508: Determine whether there is still an unprocessed compressed block.

If there is still an unprocessed compressed block, step S504 is performed.

If there is no unprocessed compressed block, step S509 continues to be performed.

Step S509: Calculate a quantity of temporary pages, and continue to perform step S510.

Step S510: Determine whether existing space in a swap sub-area of the non-volatile storage device is sufficient.

If the existing space in the swap sub-area of the non-volatile storage device is insufficient, the following step S511 is performed: Add a new swap sub-area for the process. Then, step S512 continues to be performed.

If the existing space in the swap sub-area of the non-volatile storage device is sufficient, step S512 is performed.

Step S512: Create a mapping entry for the to-be-swapped-out compressed block, and continue to perform step S513.

Step S513: Write all the temporary pages into the swap area of the non-volatile storage device, and continue to perform step S514.

Step S514: Release space of the temporarily allocated pages and the compressed block in the compressed data buffer area.

This procedure ends.

In this procedure, if the memory management module determines that a compressed block needs to be swapped out to the swap area of the non-volatile storage device, in this embodiment of this application, after a specified group swapped out by the memory management module, for example, the x compressed blocks of the application A described above, are received, x compressed blocks with a lowest use frequency in the compressed data buffer may be selected according to the LRU algorithm, the compressed blocks are sorted in descending order of data volumes, and then the compressed blocks are stored in a compressed page in an order. The compressed page is a page temporarily applied for storing a compressed block. A size of one compressed page is a size of one memory page, namely, 4 K. The selected compressed block may occupy a plurality of compressed pages, and the plurality of compressed pages are swapped out to the contiguous space in the swap area of the non-volatile storage device together.

It should be noted that, in this embodiment of this application, in a storage process, an allocated compressed page is polled to determine whether the allocated compressed page has space for storing a current compressed block, until a compressed page is found for the current compressed block. According to this step, space in each compressed page can be fully utilized, thereby improving storage efficiency. In a specific example, assuming that the memory management module specifies that 10 compressed blocks are to be swapped out, the 10 compressed blocks occupy three compressed pages, the 10 compressed blocks are sorted in descending order of data volumes: a compressed block 1, a compressed block 2, a compressed block 3, . . . , and a compressed block 10, and then the 10 compressed blocks are sequentially stored in the compressed pages. In this case, a temporary storage status of the 10 compressed blocks may be as follows:

A compressed page 1 stores the compressed blocks 1, 2, 3, and 6.

A compressed page 2 stores the compressed blocks 4, 5, 7, and 10.

A compressed page 3 stores the compressed blocks 8 and 9.

A reason is described as follows: After the compressed page 1 stores the compressed blocks 1, 2, and 3, remaining space in the compressed page 1 is insufficient for storing the compressed block 4. Therefore, the memory management module allocates a new temporary page, namely, the compressed page 2, to the compressed block 4.

During storage of the compressed block 5, the memory management module sequentially determines whether the existing compressed page 1 has sufficient space; and when finding that space in the compressed page 1 is insufficient for storage, the memory management module continues to determine whether the compressed page 2 has sufficient space. In this case, the compressed page 2 has sufficient space. Therefore, the compressed block 5 is stored in the compressed page 2.

Similarly, during storage of the compressed block 6, the memory management module sequentially determines whether the existing compressed block 1 has sufficient space; and if the existing compressed block 1 has sufficient space, the compressed block 6 is stored in the compressed page 1, and storage of the compressed block 7 is continued. The rest may be deduced by analogy.

In this embodiment of this application, one swap sub-area is allocated to the three compressed pages in a swap area management structure for maintaining a use status of the non-volatile storage device, and then the three compressed pages are written into the swap sub-area of the swap area of the non-volatile storage device.

Application scenario 2: A size of a to-be-written unit is a size of one swap sub-area, for example, 32 K.

A selected compressed block is swapped out to continuous space in the swap area of the non-volatile storage device in a form of a swap sub-area. The swap sub-area mentioned herein refers to space that is allocated by the memory management module and that is used to temporarily store a selected compressed block of a size of 32 K. The selected compressed block may occupy a plurality of temporary swap sub-areas, and the plurality of temporary swap sub-areas are swapped out to continuous space in the swap area of the non-volatile storage device together.

Swapping out a selected compressed block to continuous space in the swap area of the non-volatile storage device in a form of a temporary swap sub-area of a size of 32 K is described in detail below by using a specific embodiment.

Figure 6:
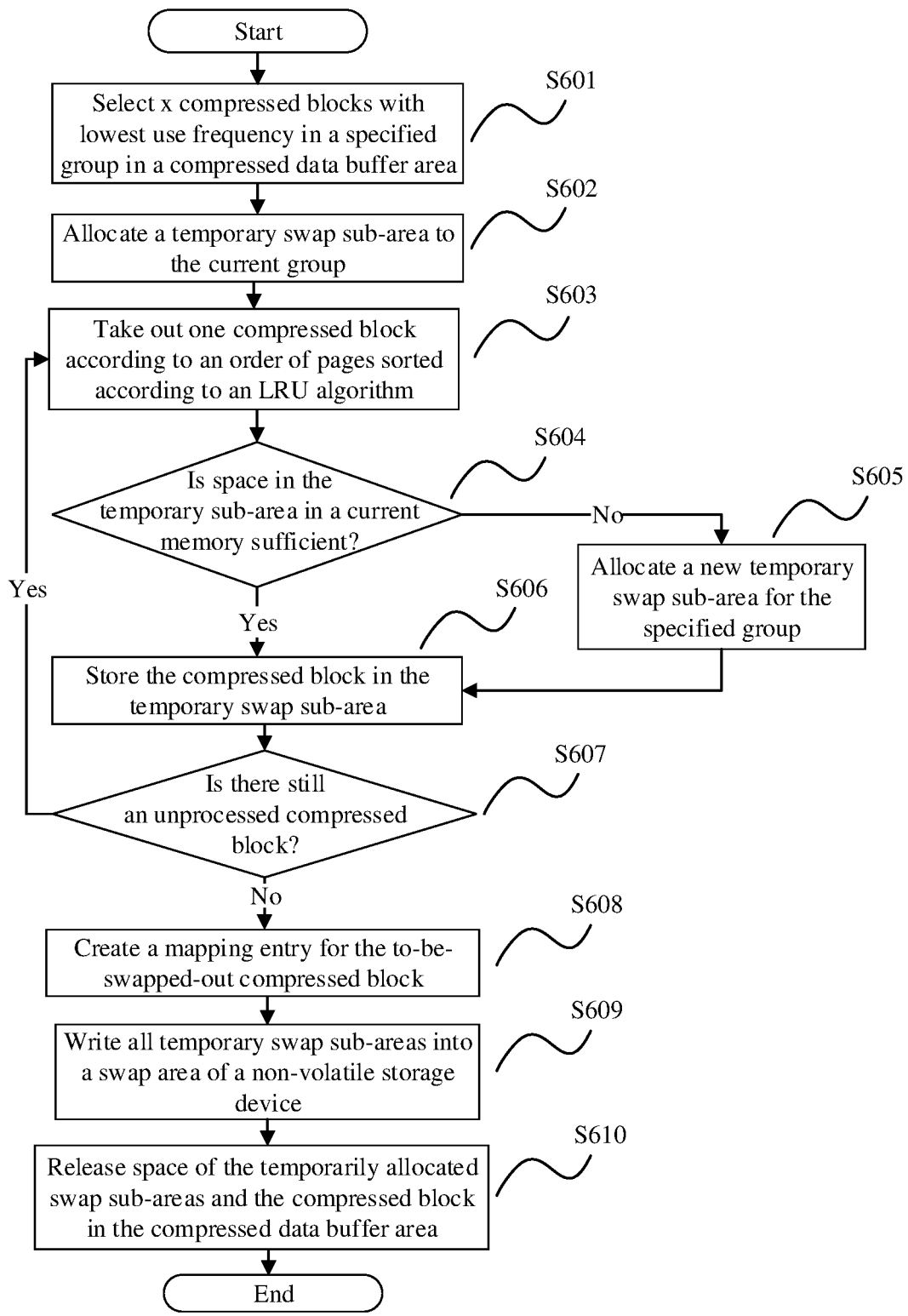
FIG. 6 is a schematic flowchart of organizing a selected compressed block into a form of a swap sub-area and swapping the compressed block into continuous space in a swap area of a non-volatile storage device according to an embodiment of this application.

Embodiment 2: FIG. 6 is a schematic flowchart of swapping out selected compressed blocks to continuous space in the swap area of the non-volatile storage device in batches in a form of a temporary swap sub-area according to this embodiment of this application. This embodiment includes the following procedure.

Step S601: Select x compressed blocks with a lowest use frequency that correspond to a specified process and that are in the compressed data buffer area, where x is a quantity of compressed blocks that is determined by an invoker, or a total data volume of the x compressed blocks is less than or equal to and is closest to a volume that is of to-be-swapped-out data and that is determined by the invoker.

Step S602: Allocate a temporary swap sub-area to a current group.

Step S603: Take out one compressed block in an order of pages sorted according to an LRU algorithm.

Step S604: Determine whether space in the temporary swap sub-area in a current memory is sufficient.

If the space in the temporary swap sub-area in the current memory is insufficient, the following step S605 is performed: Allocate a new temporary swap sub-area to the process. Then, step S606 continues to be performed.

If the space in the temporary swap sub-area in the current memory is sufficient, step S606 is performed.

Step S606: Store the compressed block in the temporary swap sub-area, and continue to perform step S607.

Step S607: Determine whether there is still an unprocessed compressed block.

If there is still an unprocessed compressed block, step S603 is performed.

If there is no unprocessed compressed block, step S608 is performed.

Step S608: Create a mapping entry for the to-be-swapped-out compressed block, and continue to perform step S609.

Step S609: Write all temporary swap sub-areas into the swap area of the non-volatile storage device, and continue to perform step S610.

Step S610: Release space of the temporarily allocated swap sub-areas and the compressed block in the compressed data buffer.

This procedure ends.

In this procedure, if the memory management module determines that a compressed block needs to be swapped out to the swap area of the non-volatile storage device, in this embodiment of this application, after a specified group swapped out by the memory management module, for example, the x compressed blocks of the application A described above, are received, x compressed blocks with a lowest use frequency in the compressed data buffer may be selected according to the LRU algorithm, a 32K temporary swap sub-area is applied for the compressed blocks, and the selected compressed blocks are stored in the temporary swap sub-area in ascending order of use frequencies according to the LRU algorithm. If space in the current swap sub-area is insufficient, a new temporary swap sub-area is applied for. The selected compressed block may occupy a plurality of temporary swap sub-areas, and the plurality of temporary swap sub-areas are swapped out to continuous space in the swap area of the non-volatile storage device together. In a specific example, it is assumed that five to-be-swapped-out compressed blocks are selected in the application A, where compressed blocks 1, 2, and 3 are stored in a temporary swap sub-area 1, and compressed blocks 4 and 5 are stored in a temporary swap sub-area 2. When all the compressed blocks are stored in the temporary swap sub-areas, the memory management module allocates two swap sub-areas in the swap area management structure for maintaining a use status of the non-volatile storage device, and then writes content of the temporary swap sub-area 1 and the temporary swap sub-area 2 into the two swap sub-areas.

The foregoing provides the detailed descriptions of the steps in the memory swapping method for page swap-out provided in this embodiment of this application.

For page swap-in:

A page swap-in procedure is performed when a page fault exception is triggered when a process accesses a page that has been swapped out. When a page fault exception occurs, it indicates that a memory page corresponding to a currently accessed memory address has been swapped out from the memory, for example, swapped out from a running memory to the swap area of the non-volatile storage device, or swapped out from a running memory to a compressed data buffer. An operating system kernel obtains a page entry from a page table, and determines, based on a page identifier, whether a page that is requested to be swapped in is in the compressed data buffer. Specifically, the operating system kernel may determine whether the page identifier is in a mapping table. If the page identifier is not in the mapping table, it indicates that page data is not in the swap area of the non-volatile storage device but in the compressed data buffer area, and in this case, the existing swap procedure is performed; otherwise, the swap area mapping table is searched based on the page identifier to determine a swap area address of the non-volatile storage device, corresponding page data is read from the swap area of the non-volatile storage device and is decompressed, and the decompressed data is stored in a physical page newly allocated when a page fault exception handling procedure is entered. This process further includes deleting a mapping entry corresponding to the page identifier of the page that is requested to be swapped in, and releasing space of the corresponding page data in the swap area of the non-volatile storage device.

It should be noted that, when data in a compressed page or an entire swap sub-area in which a requested compressed block is located is read from the swap area of the non-volatile storage device to the compressed data buffer area, a status of the compressed page or the swap sub-area is marked as "being swapped in", to prevent one swap sub-area from being simultaneously read a plurality of times. When the status of the requested compressed page or the swap sub-area is "being swapped in", requested data waits to be swapped in A process of requesting to perform page swap-in when a page fault exception is triggered in a case in which a page to be accessed by a process is not in a memory is described in detail below by using a specific embodiment.

Embodiment 3: In a case of page fault exception, a page swap-in procedure is performed.

Figure 7:
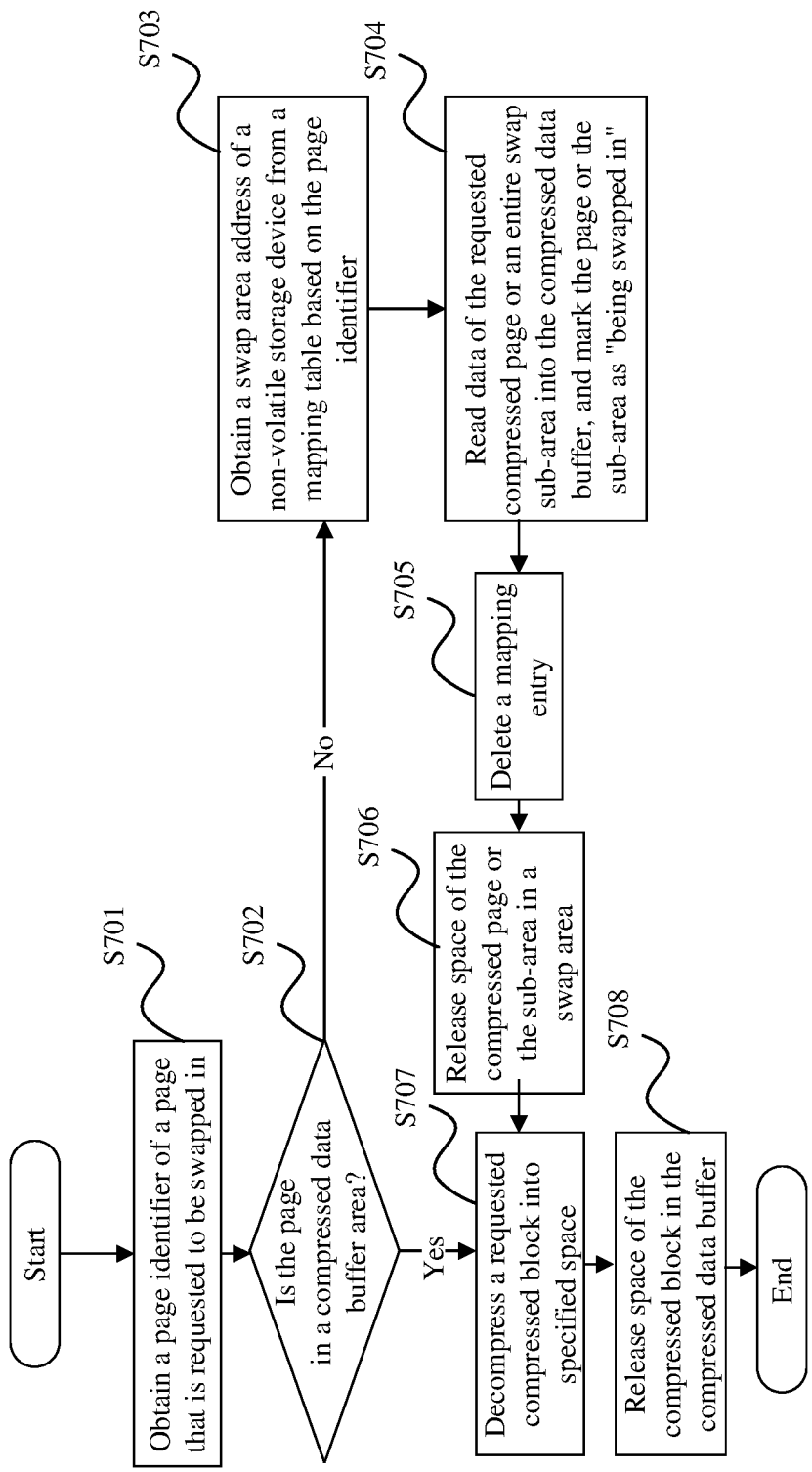
FIG. 7 is a schematic flowchart of page swap-in according to an embodiment of this application.

FIG. 7 is a schematic diagram of the page swap-in procedure according to this embodiment. This embodiment includes the following procedure.

Step S701: Obtain a page identifier of a page that is requested to be swapped in.

Step S702: Determine whether the page is in the compressed data buffer.

If the page is not in the compressed data buffer, step S703 to step S706 are performed, and then step S707 continues to be performed.

If the page is in the compressed data buffer, step S707 is performed.

Step S703: Obtain a swap area address of the non-volatile storage device from a mapping table based on the page identifier.

Step S704: Read data of the requested compressed page or an entire swap sub-area into the compressed data buffer, and mark the page or the sub-area as "being swapped in".

Step S705: Delete a mapping entry.

Step S706: Release space of the compressed page or the sub-area in the swap area.

Step S707: Decompress a requested compressed block into specified space, and continue to perform step S708.

Step S708: Release space of the compressed block in the compressed data buffer.

This procedure ends.

In this procedure, an example in which a page 1 and a page 2 of an application A need to be swapped in is used. With reference to the foregoing descriptions, the page 1 and the page 2 have been swapped out to a swap sub-area 1 of the swap area of the non-volatile storage device.

Specifically, the mapping table is searched based on page identifiers of the page 1 and the page 2, and an address of the swap sub-area 1 in which a compressed block 1 and a compressed block 2 corresponding to the page 1 and the page 2 are located is obtained from a corresponding entry in the mapping table, content of the entire swap sub-area 1 is read into the compressed data buffer from space corresponding to the address, and a status of the swap sub-area is marked as "being swapped in" in the swap area management structure for maintaining a use status of the swap area of the non-volatile storage device. After the compressed block 1 and the compressed block 2 are swapped into the compressed data buffer, mapping entries corresponding to the compressed block 1 and the compressed block 2 are deleted, and space in the swap sub-area 1 is released; in other words, the swap sub-area 1 is marked as idle in the swap area management structure. During swap-out, an address of a compressed block in the swap area of the non-volatile storage device has been recorded by using a triplet <start address of a swap sub-area, compressed block offset, compressed block length>. Therefore, after the compressed blocks are swapped into the compressed data buffer, the compressed block 1 and the compressed block 2 may be stored in the compressed data buffer based on start locations and compressed block lengths, and then decompressed from the compressed data buffer to the running memory. In this case, the page swap-in procedure ends.

The foregoing provides the detailed descriptions of the memory swapping method for page swap-in provided in this embodiment of this application.

In this embodiment of this application, because a page compression manner is used in a memory swapping process, not only a read/write volume of the non-volatile storage device is reduced, but also efficiency of reading/writing swapped-in/out data is improved. In addition, because a correlation between pages is considered in the memory swapping process, compressed blocks are organized into a to-be-written unit during swap-out through page/compressed block grouping, and at least one to-be-written unit is written into continuous space in the swap area of the non-volatile storage device each time. This reduces a quantity of read/write times of the non-volatile storage device, thereby improving performance of the swapping process.

Table 1 is a diagram of comparison between an effect of memory swapping performed by using a swap mechanism and an effect of memory swapping provided in this embodiment of this application. The comparison is performed by using one group of applications and one terminal. Comparison of the solutions is as follows:

Before optimization is performed, during swap-out of a to-be-swapped-out page from a compressed data buffer area to a swap area of a non-volatile storage device, swap-out of the memory page is directly performed without performing page compression or considering a correlation between pages. Therefore, a to-be-swapped data volume is large, a quantity of read/write times is large, and a data throughput is low. In a terminal scenario, because a flash memory is used, such a large quantity of frequent read/operations impose great pressure on a service life of the flash memory.

After optimization is performed, the to-be-swapped-out page is compressed. This reduces a to-be-swapped data volume and increases a data throughput rate. In addition, a correlation between pages is considered, and correlated pages are continuously stored in the swap area of the non-volatile storage device, thereby reducing a quantity of read/write times.

From perspectives of a to-be-swapped-out data volume, a to-be-swapped-in data volume, a program start time, and the like, Table 1 provides the comparison between the effect of memory swapping performed by using the swap mechanism and the effect of memory swapping provided in this embodiment of this application. It can be learned that, the memory swapping technology in this embodiment of this application can reduce a read/write volume of the non-volatile storage device, reduce impact of memory swapping on a service life of the non-volatile storage device, and can further improve swapping performance

TABLE 1

| Solution | Swapped-out data volume | Swapped-in data volume | Program start time |
| --- | --- | --- | --- |
| Swap mechanism | 42157 MB | 36010 MB | 822 ms |
| 32K batch swap-out | 17127 MB | 14521 MB | 337 ms |

Figure 8:
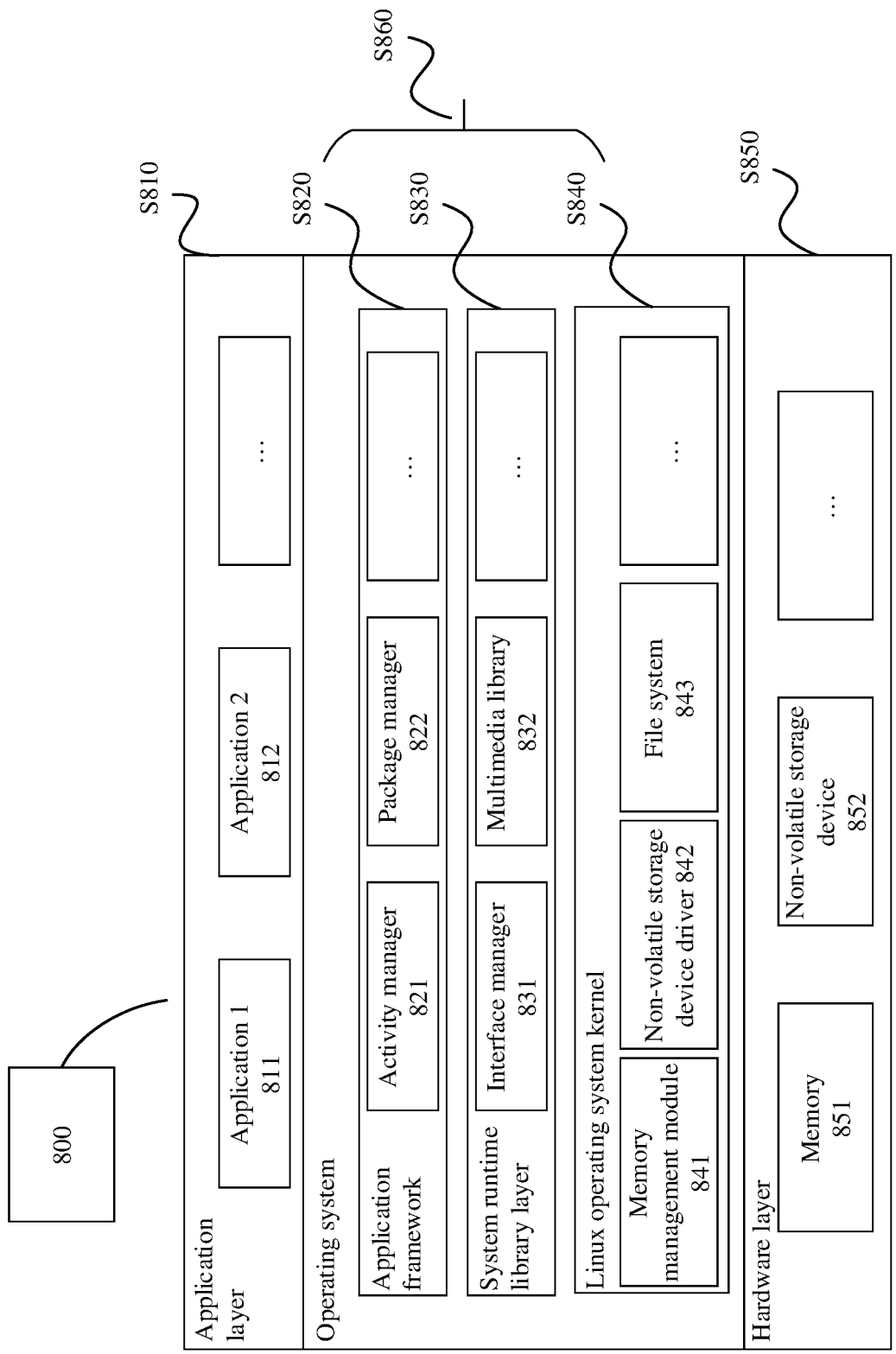
FIG. 8 is a schematic diagram of a structure of a computer system according to an embodiment of this application.

The foregoing mainly describes a specific procedure of the method provided in embodiments of this application. With reference to FIG. 8, the following uses an Android operating system as an example to describe an implementation location and a runtime status of the method provided in embodiments of this application. For a more specific method procedure, refer to the descriptions in the foregoing embodiments.

FIG. 8 is a schematic diagram of a structure of a computer system according to an embodiment of this application. The computer system 800 may be a terminal device, or may be other types of computer devices.

The computer system includes an application layer 810 and an operating system layer 860. The operating system may be an Android operating system. The operating system layer 860 is further divided into an application framework layer 820, a system runtime library layer 830, and a Linux operating system kernel layer 840. The operating system layer 860 in FIG. 8 may be considered as a specific implementation of the operating system in FIG. 1, and the application layer 810 in FIG. 8 may be considered as a specific implementation of the application program 181 in FIG. 1. The Linux operating system kernel layer 840 provides a core and management of the operating system, and includes a memory management module 841, a non-volatile storage device driver 842, a file system 843, and the like. The system runtime library layer 830 includes an interface manager 831, a multimedia library 832, and the like. The application framework layer 820 may include an activity manager, a package manager, and the like. The application layer 810 may include an application 1, an application 2, and the like.

In addition, the computer system 800 further includes a hardware layer 850. The hardware layer in the computer system 800 may include a memory 851, a non-volatile storage device 852 (which is equivalent to the memory 180 in FIG. 1), and the like.

The method provided in any one of the foregoing embodiments of this application can be implemented in the operating system layer 860 shown in FIG. 8.

It can be learned from the apparatus and the method described above that, the computer system to which the memory swapping method provided in embodiments of this application is applied can compress memory pages and then perform grouping and swap-in and/or swap-out on the compressed memory pages. In this way, a read/write volume of a non-volatile storage device can be reduced, and performance in a swapping process can be improved. In addition, a quantity of read/write times can be reduced, thereby reducing impact on a service life of the non-volatile storage device.

Figure 9:
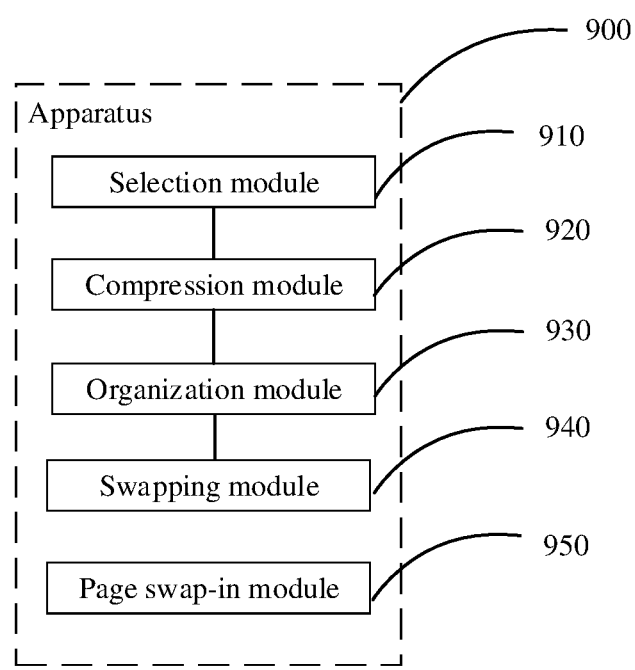
FIG. 9 is a schematic diagram of a structure of a memory swapping apparatus according to an embodiment of this application.

FIG. 9 shows a memory swapping apparatus 900 according to an embodiment of this application. The memory swapping apparatus 900 is located at an operating system layer 860. The apparatus 900 includes:

a selection module 910, configured to select n to-be-swapped-out pages;

a compression module 920, configured to: compress the n to-be-swapped-out pages into n compressed blocks, and buffer the n compressed blocks in a compressed data buffer area;

an organization module 930, configured to organize at least one of the n compressed blocks into m to-be-written units, where m is an integer less than or equal to n and greater than 0, and a size of the to-be-written unit is an integer quantity of pages;

a swapping module 940, configured to write the m to-be-written units into a swap area of a non-volatile storage device in a maximum of m batches, where at least one to-be-written unit is stored in a segment of continuous space in the swap area; and a page swap-in module 950, configured to: obtain, from a mapping table based on a page identifier of a page that is requested to be swapped in, a swap area address corresponding to the page identifier of the page that is requested to be swapped in; and read a compressed block from the obtained swap area address, and store the compressed block in the compressed data buffer area.

For a specific implementation of the solutions in the apparatus embodiments, refer to the foregoing method embodiments. Details are not described herein.

The apparatus provided in this embodiment of this application may simultaneously perform swap-out processing and swap-in processing of a memory page, or may separately perform swap-out processing of a memory page and swap-in processing of the memory page.

The apparatus embodiments described above are merely examples, and the units described as separate parts may or may not be physically separate. Some or all of the modules may be selected according to an actual requirement to achieve the objectives of the solutions of the embodiments. In addition, in the accompanying drawings of the apparatus embodiments provided in this application, modules may be communicatively connected to each other by using one or more communication buses or signal lines. A person of ordinary skill in the art may understand and implement embodiments of this application without creative efforts.

The foregoing descriptions are merely specific implementations of this application, but are not intended to limit the protection scope of this application.

What is claimed is:

1. A memory swapping method, comprising:
   selecting n to-be-swapped-out pages, wherein n is an integer greater than 0;
   compressing the n to-be-swapped-out pages into n compressed blocks, grouping the n compressed blocks into at least one group based on a group identifier, and buffering the at least one group in a compressed data buffer area, wherein compressed blocks comprised in each group have a same group identifier;
   organizing at least one compressed block in one group into m to-be-written units, wherein m is an integer less than or equal to n and greater than 0, and a size of each of the m to-be-written units is an integer quantity of pages; and
   writing the m to-be-written units into a swap area of a non-volatile storage device in a maximum of m batches, wherein at least one to-be-written unit in the m to-be-written units is stored in a segment of continuous space in the swap area,
   wherein before the organizing at least one compressed block in one group into m to-be-written units, the method further comprises;
   selecting a part of the at least one group based on a second indication, wherein the second indication comprises the group identifier, and the second indication is sent by an operating system or an application at an application layer, and
   wherein the second indication further comprises a quantity of compressed blocks or a to-be-swapped-out data volume, and the quantity of compressed blocks or the to-be-swapped-out data volume indicates a quantity of to-be-swapped-out compressed blocks in a group indicated by the group identifier or a volume of to-be-swapped-out data in the group indicated by the group identifier.

2. The method according to claim 1, wherein the selecting n to-be-swapped-out pages comprises:
   receiving a first indication, wherein the first indication comprises the group identifier, and the first indication is sent by the operating system or the application at the application layer; and
   selecting the n to-be-swapped-out pages with the group identifier.

3. The method according to claim 2, wherein the group identifier comprises an identifier of a process group corresponding to similar resource use behaviors, a process identifier, an application identifier, or an access time.

4. A memory swapping method, comprising:
   selecting n to-be-swapped-out pages, wherein n is an integer greater than 0;
   compressing the n to-be-swapped-out pages into n compressed blocks, grouping the n compressed blocks into at least one group based on a group identifier, and buffering the at least one group in a compressed data buffer area, wherein compressed blocks comprised in each group have a same group identifier;
   organizing at least one compressed block in one group into m to-be-written units, wherein m is an integer less than or equal to n and greater than 0, and a size of each of the m to-be-written units is an integer quantity of pages; and writing the n to-be-written units into a swap area of a non-volatile storage device in a maximum of m batches, wherein at least one to-be-written unit in the m to-be-written units is stored in a segment of continuous space in the swap area, wherein before the writing the m to-be-written units into a swap area of a non-volatile storage device in a maximum of m batches, the method further comprises:

creating a mapping table, wherein the mapping table comprises a correspondence between a page identifier of the at least one of the n compressed blocks and a swap area address corresponding to the at least one of the n compressed blocks, the page identifier is an identifier of at least one to-be-swapped-out page corresponding to the at least one of the n compressed blocks, the swap area address is an address of a segment of space that belongs to the swap area and that is allocated to the at least one of the n compressed blocks, and the mapping table is used to obtain the swap area address during page swap-in by using the page identifier.

5. The method according to claim 4, further comprising:
obtaining, from the mapping table based on a page identifier of a page that is requested to be swapped in, a swap area address corresponding to the page identifier of the page that is requested to be swapped in; and
reading a compressed block from the obtained swap area address, and storing the at least one of the n compressed blocks in the compressed data buffer area.

6. The method according to claim 4, further comprising:
obtaining, from the mapping table based on a page identifier of a page that is requested to be swapped in, a swap area address corresponding to the page identifier of the page that is requested to be swapped in; and
reading, from the obtained swap area address, a to-be-written unit in which the at least one of the n compressed blocks is located, and storing the to-be-written unit in the compressed data buffer area.

7. The method according to claim 6, further comprising:
marking a status of the to-be-written unit as "being swapped in".

8. A computer device, wherein the computer device comprises a processor and a memory, the memory is configured to store instructions, and the processor is configured to invoke the instructions to:
select n to-be-swapped-out pages, wherein n is an integer greater than 0;
compress the n to-be-swapped-out pages into n compressed blocks, grouping the n compressed blocks into at least one group based on a group identifier, and buffering the at least one group in a compressed data buffer area, wherein compressed blocks comprised in each group have a same group identifier;
organize at least one compressed block in one group into m to-be-written units, wherein m is an integer less than or equal to n and greater than 0, and a size of each of the m to-be-written units is an integer quantity of pages; and
write the m to-be-written units into a swap area of a non-volatile storage device in a maximum of m batches, wherein at least one of the m to-be-written units in the m to-be-written units is stored in a segment of continuous space in the swap area,
wherein the processor is further configured to:

select a part of the at least one group based on a second indication is sent by an operating system or an application at an application layer, and
wherein the second indication further comprises a quantity of compressed blocks or a to-be-swapped-out data volume, and the quantity of compressed blocks or the to-be-swapped-out data volume indicates a quantity of to-be-swapped-out compressed blocks in a group indicated by the group identifier or a volume of to-be-swapped-out data in the group indicated by the group identifier.

9. The computer device according to claim 8, wherein the processor is further configured to:
receive a first indication, wherein the first indication comprises the group identifier, and the first indication is sent by the operating system or the application at the application layer; and
select the n to-be-swapped-out pages with the group identifier.

10. The computer device according to claim 9, wherein the group identifier comprises an identifier of a process group corresponding to similar resource use behaviors, a process identifier, an application identifier, or an access time.

11. A computer device, wherein the computer device comprises a processor and a memory, the memory is configured to store instructions, and the processor is configured to invoke the instructions to:
select n to-be-swapped-out pages, wherein n is an integer greater than 0,
compress the n to-be-swapped-out pages into n compressed blocks, grouping the n compressed blocks into at least one group based on a group identifier, and buffering the at least one group in a compressed data buffer area, wherein compressed blocks comprised in each group have a same group identifier;
organize at least one compressed block in one group into m to-be-written units, wherein m is an integer less than or equal to n and greater than 0, and a size of each of the m to-be-written units is an integer quantity of pages; and
write the m to-be-written units into a swap area of a non-volatile storage device in a maximum of m batches, wherein at least one of the m to-be-written units in the m to-be-written units is stored in a segment of continuous space in the swap area,
wherein the processor is further configured to:
create a mapping table, wherein the mapping table comprises a correspondence between a page identifier of the at least one of the n compressed blocks and a swap area address corresponding to the at least one of the n compressed blocks, the page identifier is an identifier of at least one to-be-swapped-out page corresponding to the at least one of the n compressed blocks, the swap area address is an address of a segment of space that belongs to the swap area and that is allocated to the at least one of the n compressed blocks, and the mapping table is used to obtain the swap area address during page swap-in by using the page identifier.

12. The computer device according to claim 11, wherein the processor is further configured to:
obtain, from the mapping table based on a page identifier of a page that is requested to be swapped in, a swap area address corresponding to the page identifier of the page that is requested to be swapped in; and read a compressed block from the obtained swap area address, and store the at least one of the n compressed blocks in the compressed data buffer area.

\* \* \* \* \*

UNITED STATES PATENT AND TRADEMARK OFFICE
CERTIFICATE OF CORRECTION

PATENT NO. : 11,928,359 B2
APPLICATION NO. : 17/867880
DATED : March 12, 2024
INVENTOR(S) : Chengke Wang et al.

It is certified that error appears in the above-identified patent and that said Letters Patent is hereby corrected as shown below:

In the Specification

Column 2, Line 62, change "110 operation" to --I/O operation--;

Column 11, Line 66, change ""I"" to --"/"--;

Column 13, Line 50, change "then" to --the n--;

Column 14, Line 13, change "then" to --the n--;

In the Claims

Claim 4, Column 25, Line 4, change "writing the n" to --writing the m--; and

Claim 8, Column 26, Line 1, change "select a part of the at least one group based on a second indication" to --select a part of the at least one group based on a second indication, wherein the second indication comprises the group identifier, and the second indication--.

Signed and Sealed this
Ninth Day of April, 2024

Katherine Kelly Vidal
Director of the United States Patent and Trademark Office